(12) United States Patent
Bhargava et al.

(10) Patent No.: US 11,860,087 B2
(45) Date of Patent: Jan. 2, 2024

(54) METHOD AND APPARATUS FOR NANOSCALE INFRARED ABSORPTION TOMOGRAPHY

(71) Applicant: The Board of Trustees of the University of Illinois, Urbana, IL (US)

(72) Inventors: Rohit Bhargava, Champaign, IL (US); Seth M Kenkel, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 0 days.

(21) Appl. No.: 17/712,128

(22) Filed: Apr. 2, 2022

(65) Prior Publication Data
US 2022/0326148 A1 Oct. 13, 2022

Related U.S. Application Data

(60) Provisional application No. 63/170,407, filed on Apr. 2, 2021.

(51) Int. Cl.
*G01N 21/3563* (2014.01)
*G01Q 60/24* (2010.01)
*G01N 21/39* (2006.01)

(52) U.S. Cl.
CPC ......... *G01N 21/3563* (2013.01); *G01Q 60/24* (2013.01); *G01N 21/39* (2013.01); *G01N 2201/06113* (2013.01)

(58) Field of Classification Search
CPC ..... G01N 21/3563; G01N 21/39; G01Q 60/24
See application file for complete search history.

(56) References Cited

U.S. PATENT DOCUMENTS 6,491,425 B1 * 12/2002 Hammiche ........ G01N 25/4833
  977/869
10,295,560 B2 * 5/2019 Yoxall .................... G01Q 60/22
(Continued)

OTHER PUBLICATIONS

Lu, F.; Jin, M.; Belkin, M. A., Tip-enhanced infrared nanospectroscopy via molecular expansion force detection. Nature Photonics 2014, 8 (4), 307-312.
(Continued)

*Primary Examiner* — Hugh Maupin
(74) *Attorney, Agent, or Firm* — McDonnell Boehnen Hulbert & Berghoff LLP

(57) ABSTRACT

A method for nanoscale tomographic infrared absorption imaging is provided, the method including: generating a first plurality of sets of probe measurements for a plurality of sample locations located across a surface of a sample, and measuring a magnitude and phase of a variation in displacement of the surface of the sample at the particular sample location at the second frequency, wherein the first frequency and the second frequency differ; and generating, based on the first plurality of sets of probe measurements, a three-dimensional tomographic map of absorption of infrared light at the first wavelength by the sample. Generating measurements for a particular location includes generating a first probe measurement by illuminating the sample with infrared light that varies at a first frequency and measuring a variation in displacement of the surface of the sample at the particular sample location at the first frequency.

20 Claims, 10 Drawing Sheets

(56) References Cited

U.S. PATENT DOCUMENTS

| | | | | |
|---|---|---|---|---|
| 2006/0222047 | A1* | 10/2006 | Reading | G01Q 30/02 374/120 |
| 2011/0041223 | A1* | 2/2011 | Jesse | B82Y 35/00 850/5 |
| 2012/0096601 | A1* | 4/2012 | Schotland | B82Y 35/00 850/30 |
| 2015/0077819 | A1* | 3/2015 | Schnell | G03H 1/0443 359/9 |

OTHER PUBLICATIONS

Jahng, J.; Potma, E. O.; Lee, E. S., Tip-Enhanced Thermal Expansion Force for Nanoscale Chemical Imaging and Spectroscopy in Photoinduced Force Microscopy. Analytical Chemistry 2018, 90 (18), 11054-11061.

O'Callahan, B. T.; Yan, J.; Menges, F.; Muller, E. A.; Raschke, M. B., Photoinduced Tip-Sample Forces for Chemical Nanoimaging and Spectroscopy. Nano Letters 2018, 18 (9), 5499-5505.

Nowak, D.; Morrison, W.; Wickramasinghe, H. K.; Jahng, J.; Potma, E.; Wan, L.; Ruiz, R.; Albrecht, T. R.; Schmidt, K.; Frommer, J.; Sanders, D. P.; Park, S., Nanoscale chemical imaging by photoinduced force microscopy. Science Advances 2016, 2 (3), e1501571.

Cvitkovic, A.; Ocelic, N.; Hillenbrand, R., Analytical model for quantitative prediction of material contrasts in scattering-type near-field optical microscopy. Opt. Express 2007, 15 (14), 8550-8565.

Babicheva, V. E.; Gamage, S.; Stockman, M. I.; Abate, Y., Near-field edge fringes at sharp material boundaries. Opt. Express 2017, 25 (20), 23935-23944.

Mastel, S.; Govyadinov, A. A.; Maissen, C.; Chuvilin, A.; Berger, A.; Hillenbrand, R., Understanding the Image Contrast of Material Boundaries in IR Nanoscopy Reaching 5 nm Spatial Resolution. ACS Photonics 2018, 5 (8), 3372-3378.

Black, E. D.; Grudinin, I. S.; Rao, S. R.; Libbrecht, K. G., Enhanced photothermal displacement spectroscopy for thin-film characterization using a Fabry-Perot resonator. Journal of Applied Physics 2004, 95 (12), 7655-7659.

Wilson, R. B.; Cahill, D. G., Anisotropic failure of Fourier theory in time-domain thermoreflectance experiments. Nat Commun 2014, 5, 5075.

Gaiduk, A.; Ruijgrok, P. V.; Yorulmaz, M.; Orrit, M., Detection limits in photothermal microscopy. Chemical Science 2010, 1 (3), 343-350.

Shaykhutdinov, T.; Furchner, A.; Rappich, J.; Hinrichs, K., Mid-infrared nanospectroscopy of Berreman mode and epsilon-near-zero local field confinement in thin films. Opt. Mater. Express 2017, 7 (10), 3706-3714.

Giliberti, V.; Polito, R.; Ritter, E.; Broser, M.; Hegemann, P.; Puskar, L.; Schade, U.; Zanetti-Polzi, L.; Daidone, I.; Corni, S.; Rusconi, F.; Biagioni, P.; Baldassarre, L.; Ortolani, M., Tip-Enhanced Infrared Difference-Nanospectroscopy of the Proton Pump Activity of Bacteriorhodopsin in Single Purple Membrane Patches. Nano Letters 2019, 19 (5), 3104-3114.

HillenBrand, R.; Knoll, B.; Keilmann, F., Pure optical contrast in scattering-type scanning near-field microscopy. 2001, 202 (1), 77-83.

Möbus, G.; Inkson, B. J., Nanoscale tomography in materials science. Materials Today 2007, 10 (12), 18-25.

Toivanen, J. M.; Tarvainen, T.; Huttunen, J. M. J.; Savolainen, T.; Orlande, H. R. B.; Kaipio, J. P.; Kolehmainen, V., 3D thermal tomography with experimental measurement data. International Journal of Heat and Mass Transfer 2014, 78, 1126-1134.

Govyadinov, A. A.; Mastel, S.; Golmar, F.; Chuvilin, A.; Carney, P. S.; Hillenbrand, R., Recovery of permittivity and depth from near-field data as a step toward infrared nanotomography. ACS Nano 2014, 8 (7), 6911-6921.

* cited by examiner

METHOD AND APPARATUS FOR NANOSCALE INFRARED ABSORPTION TOMOGRAPHY

CROSS-REFERENCE TO RELATED APPLICATION

This application claims priority to and incorporates by reference the content of U.S. Provisional Pat. App. No. 63/170,407, filed Apr. 2, 2021. This application also incorporates by reference the content of U.S. Pat. No. 11,143,672, filed Jun. 24, 2020 and issued Oct. 12, 2021.

BACKGROUND

It is desirable in many applications to characterize samples at the nanoscale, e.g., biological samples, mineral samples, manufactured semiconductor devices. Such characterization can include determining the spectrum of light absorption, e.g., infrared absorption, across the material so as to facilitate the identification of chemical contents of the sample. This could include identifying particular proteins, amino acids, organic molecules, or other molecular contents of a biological sample at the nanoscale so as to, e.g., locate and identify discrete organic molecules therein.

One existing method for such nanoscale characterization of a sample is atomic force microscopy (AFM) employed to perform nano-scale infrared (IR) spectroscopy. Such AFM-IR methods detect the displacement (e.g., outward expansion) of the surface of the sample at a particular location in response to illumination with a particular wavelength of infrared light as a proxy for the level of absorptivity of the sample at the particular location for the particular wavelength. Such displacement measurements can be repeated for an array of different locations across the surface of the sample and at a variety of different wavelengths of IR illumination so as to build up a map of the IR absorption spectrum of the sample across its surface. However, such conventional methods have been limited to two-dimensional characterization of samples, being unable to generate three-dimensional tomographic information about the IR absorption properties for such a sample, at various different depths within the sample.

SUMMARY

An aspect of the present disclosure relates to a method for nanoscale tomographic infrared absorption imaging, the method including: (i) generating a first plurality of sets of probe measurements for a plurality of sample locations located across a surface of a sample, wherein generating, for a particular sample location, a particular set of probe measurements of the first plurality of sets of probe measurements includes: (a) generating a first probe measurement of the particular set of probe measurements by (1) illuminating the sample with infrared light at a first wavelength that varies at a first frequency and (2) measuring a magnitude and phase of a variation in displacement of the surface of the sample at the particular sample location at the first frequency; and (b) generating a second probe measurement of the particular set of probe measurements by (1) illuminating the sample with infrared light at the first wavelength that varies at a second frequency and (2) measuring a magnitude and phase of a variation in displacement of the surface of the sample at the particular sample location at the second frequency, wherein the first frequency and the second frequency differ; and (ii) generating, based on the first plurality of sets of probe measurements, a three-dimensional tomographic map of absorption of infrared light at the first wavelength by the sample.

Another aspect of the present disclosure relates to a system for nanoscale tomographic infrared absorption imaging, the system including: (i) an infrared light emitter; (ii) an actuated probe configured to detect displacement of a surface of a sample; and (iii) a controller comprising one or more processors. The one or more processors are configured to perform controller operations including: (i) generating a first plurality of sets of probe measurements for a plurality of sample locations located across a surface of a sample, wherein generating, for a particular sample location, a particular set of probe measurements of the first plurality of sets of probe measurements includes: (a) generating a first probe measurement of the particular set of probe measurements by (1) operating the infrared light emitter to illuminate the sample with infrared light at a first wavelength that varies at a first frequency and (2) operating the actuated probe to measure a magnitude and phase of a variation in displacement of the surface of the sample at the particular sample location at the first frequency; and (b) generating a second probe measurement of the particular set of probe measurements by (1) operating the infrared light emitter to illuminate the sample with infrared light at the first wavelength that varies at a second frequency and (2) operating the actuated probe to measure a magnitude and phase of a variation in displacement of the surface of the sample at the particular sample location at the second frequency, wherein the first frequency and the second frequency differ; and (ii) generating, based on the first plurality of sets of probe measurements, a three-dimensional tomographic map of absorption of infrared light at the first wavelength by the sample.

Yet another aspect of the present disclosure relates to a method for nanoscale tomographic imaging of heat dissipation in electronic devices, the method including: (i) generating a first plurality of sets of probe measurements for a plurality of sample locations located across a surface of an electronic device, wherein generating, for a particular sample location, a particular set of probe measurements of the first plurality of sets of probe measurements includes: (a) generating a first probe measurement of the particular set of probe measurements by (1) operating the electronic device to dissipate heat in a manner that varies at a first frequency and (2) measuring a magnitude and phase of a variation in displacement of the surface of the electronic device at the particular sample location at the first frequency; and (b) generating a second probe measurement of the particular set of probe measurements by (1) operating the electronic device to dissipate heat in a manner that varies at a second frequency and (2) measuring a magnitude and phase of a variation in displacement of the surface of the electronic device at the particular sample location at the second frequency, wherein the first frequency and the second frequency differ; and (ii) generating, based on the first plurality of sets of probe measurements, a three-dimensional tomographic map of dissipation of heat by the electronic device.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this docu-

DETAILED DESCRIPTION

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

It should be understood that the below embodiments, and other embodiments described herein, are provided for explanatory purposes, and are not intended to be limiting.

I. Overview

It is desirable in many contexts to characterize the composition of a sample at the nanometer scale, e.g., to identify the chemical content and structure of the sample at the single-molecule level. For example, it can be desirable to identify the individual molecules or molecular moieties thereof of a biological sample. One family of methods for such nano-scale sample characterization is infrared atomic force microscopy (AFM-IR), where an atomic force microscope (AFM) is combined with a tunable-wavelength IR laser. The AFM is used to determine the pattern of absorptivity of the sample across the surface of the sample by detecting the magnitude of displacement (e.g., upward expansion) of the surface of the sample in response to illumination, and thus warming, by different wavelengths of IR illumination. The spectrum of IR absorptivity determined in this manner can be used to identify the chemical contents of the sample, e.g., by matching the spectrum determined for a particular location of the sample to a matching spectrum of a known molecule.

Figure 1:
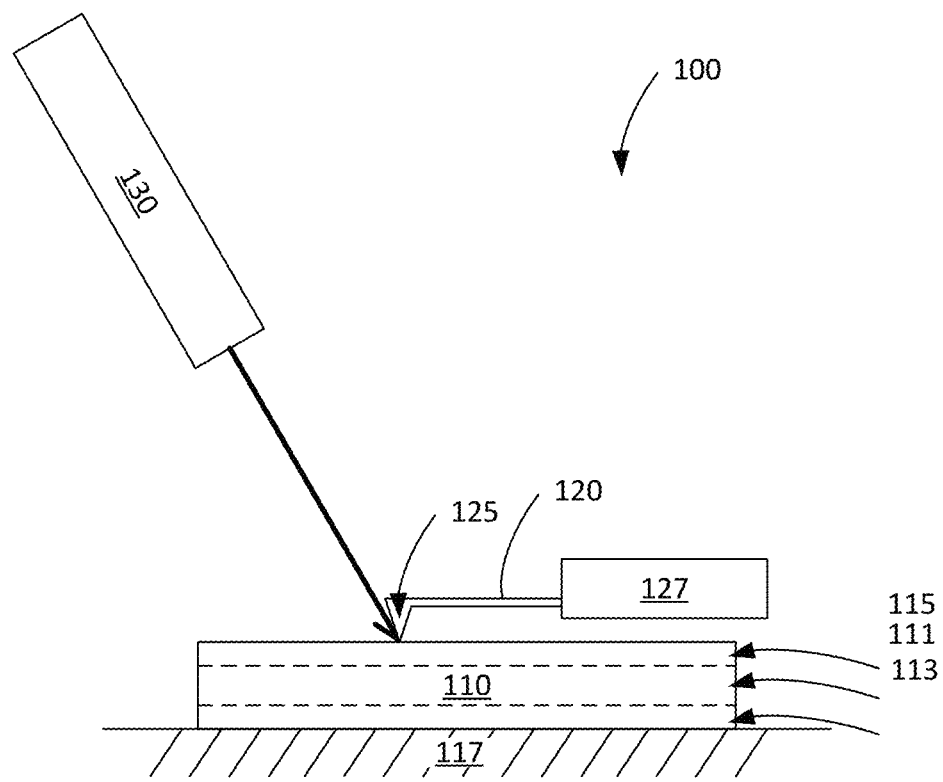
FIG. 1 illustrates elements of an AFM-IR system, according to an example embodiment.

FIG. 1 illustrates aspects of an example AFM-IR system 100. A sample 110 is mounted on a stage 117. A probe 120 (e.g., a silicon probe) is coupled to an actuator 127. The probe 120 has a tip 125 via which the probe 120 contacts the surface of the sample 110. The actuator 127 operates to maintain the tip 125 in contact with the surface of the sample (e.g., at a specified level of contact force) and to move the tip 125 across different locations across the surface of the sample 110, thereby allowing the location and/or time-varying displacement of the surface of the sample 110 to be mapped. Additionally or alternatively, an additional actuator (not shown) may be coupled to the stage 117 and be configured, in combination with the actuator 127 coupled to the probe 120, to facilitate mapping of the surface of the sample 110 by controlling the location of the sample 110. An infrared light source 130 (e.g., a tunable laser) is operable to provide infrared illumination to the sample 110 (e.g., to a region of the sample that contains a point of contact with the tip 125) at various different wavelengths, so as to facilitate the determination of IR absorption spectra for the contents of the sample 110. As shown, the sample includes multiple different layers. The different layers could be provided to facilitate sample handling and/or interrogation. For example, a biological sample layer 111 could be disposed on a silicon substrate layer 113 to provide mechanical stability in probing the sample. A cover layer 115 could be disposed on the biological sample layer 115 in order to reduce the effects of tip enhancement on the interrogation of the sample, e.g., by composing the cover layer 115 of SU8 or of some other material that is substantially non-absorptive at the IR wavelengths of interest.

The deflection and/or location of the tip 125 could be detected in a variety of ways, e.g., by using feedback to control the angle of deflection of the probe, thereby maintaining the contact force of the probe tip 125 against the sample surface 110 at a specified level. The methods used to actuate and/or measure the probe 120 could be such that an enhanced signal to noise ratio for a particular application is provided, e.g., a signal-to-noise ration greater than 100 with respect to the magnitude and phase of the time-varying displacement of the surface of the sample 110 surface at a frequency equal to a frequency of variation over time of the intensity of the IR illumination provided to the sample 110 by the infrared light source 130. This could include implementing the systems or methods described in U.S. Pat. No. 11,143,672, "Method and Apparatus for Correcting Responsivity Variation in Photothermal Imaging."

Note that the methods described herein generally refer to the use of AFM in contact mode to detect the magnitude and phase of time-varying displacement of the surface of a sample in response to time-varying illumination thereof, in order to generate AFM measurement datasets sufficient to reconstruct a 3D tomographic dataset that describes the 3D pattern of IR absorptivity within the sample. However, it should be understood that the methods described herein can be extended to the use of other methods to detect the displacement of the sample surface, e.g., using laser interferometry. Indeed, the inverse methods for 3D tomography described below, which utilize thermoelastic Green's functions as forward models to solve the inverse problem of 3D tomographic reconstructions, can be adapted to determine other measurable time-varying physical parameter on or within a sample. For example, the temperature on or within the sample could be measured (e.g., by leveraging information about a thermo-optical property of the sample) and a thermoelastic Green's function determined for the sample that relates the 3D pattern of heating within the sample, provided at a specified frequency, to the magnitude and phase of variation of the measured temperature on or within the sample at the specified frequency. Accordingly, optical camera-based imaging (e.g., wide-field imaging) to detect photo-induced heating or other detection methods can be applied to generate data that can then be used, according to the methods described herein, to determine a 3D tomographic dataset that describes the 3D pattern of IR absorptivity within a sample.

Conventional AFM-IR methods and instruments provide high-resolution IR spectrometry data in two dimensions across the surface of samples. However, those conventional methods are limited to producing such two-dimensional data, and cannot provide three-dimensional tomographic information about the pattern of IR absorptivity at varying depths in within such samples. The methods described herein provide modifications to the configuration and/or operation of AFM-IR instruments (or of other instruments capable of providing variable-frequency IR illumination to a sample and measuring the same-frequency response thereto by the sample) to facilitate the determination of 3D tomographic IR absorptivity data for varying depths throughout the thickness of samples of interest. The relationship between the magnitude and phase of the displacement of the sample surface and the pattern of heating within the sample (which may be represented as a thermoelastic Green's function, as described in greater detail below) is dependent on the frequency of variation of the IR illumination provided to the sample, with greater volumes, and deeper depths, of the sample having a greater impact on the displacement on the surface for lower-frequencies than for higher frequencies. Thus, information sufficient to reconstruct the 3D tomographic pattern of heating within the sample (and thus to imply the corresponding 3D pattern of IR absorptivity) can be generated by measuring the magnitude and phase of the time-varying displacement of the sample surface at a plurality of different locations across the surface and for a set of different frequencies of variation of the applied IR illumination.

These methods are facilitated by the use of AFM or other sample-interrogation apparatus that are able to provide very high signal-to-noise ratio interrogation of the magnitude and phase of the time-varying displacement of the surface of a sample (or of a temperature at the surface of or within the sample, or some other sufficient physical parameter of the sample) at a variety of locations across the surface of the sample and for a variety of different frequencies of variation of the provided IR illumination. For example, the methods described herein for 3D tomographic reconstruction of IR absorptivity throughout a sample could be accomplished based on AFM measurements of the time-varying displacement of the surface of a sample having single-to-noise ratios in excess of 100. An AFM or other instrument could be configured to provide measurement of such quality by, e.g., implementing the systems or methods described in U.S. Pat. No. 11,143,672, "Method and Apparatus for Correcting Responsivity Variation in Photothermal Imaging."

Another approach to provide AFM measurements sufficient to perform 3D tomographic reconstruction of the IR absorptivity within a sample is to account for enhancement of the provided IR illumination by a tip of the AFM. In practice, many AFM probes act to enhance illumination to which they are exposed, resulting in the region of a sample proximate to the probe tip receiving effectively higher intensity illumination than the more uniform illumination that less proximate regions receive. This tip enhancement effect can 'wash out' those portions of the signal related to deeper volumes of the sample by causing the displacement signal to preferentially represent surface volumes of the sample. To compensate for this, the reconstruction methods described herein can be modified (as described in greater detail below, e.g., by modifying a thermoelastic Green's function to account for such effects) to model the tip enhancement effect.

Additionally or alternatively, the sample and/or apparatus can be modified to minimize the magnitude of the tip enhancement effect. For example, an AFM probe tip could be used that is composed of silicon, that lacks gold or other IR-enhancing coatings or materials, or that is otherwise configured to exhibit no or minimal tip enhancement. For example, the tip of such an AFM probe could exhibit a magnitude of electric field enhancement M (defined as defined as $|M|^2=|E_{loc}/E_{in}|^2$, where $E_{loc}$ and $E_{in}$ are local and incident electric field, respectively) at a location 0.5 nm below the tip that is less than 200, or that is less than 100. Additionally or alternatively, a layer of material could be added to a sample of interest that is substantially non-absorptive at IR wavelengths of interest. The thickness and composition of such a layer could be specified such that the volume of space, relative to the probe tip, that experiences tip-enhancement effects exhibits sufficiently low levels of total IR absorption that the tip enhancement effect has reduced impact on heating of the sample and thus reduced impact on the measured displacement of the sample surface in response to the IR illumination. For example, an additional top-coating of 400-600 nm (e.g., 500 nm) of SU8 or some other minimally IR absorptive material could be added to the top surface of a sample prior to interrogation using an AFM-IR instrument.

A 'forward model' that relates the magnitude and phase of the time-varying surface displacement of a sample to the three-dimensional pattern of heating within the sample (e.g., a thermoelastic Green's function) in response to time-varying illumination of the sample by infrared light can be determined in a variety of ways, as described in greater detail below. This can include using measured and/or estimated thermoelastic properties of a sample of interest to generate thermoelastic Green's functions at a plurality of different frequencies of applied time-varying IR illumination. Additionally or alternatively, such Green's functions could be empirically fitted to data measured using data about the known geometry of IR absorptivity within the sample. For example, a bead, disc, edge, or other artifact of known geometry and IR absorption properties could be inserted into a sample of interest. The artifact could absorb IR at a wavelength at which the remainder of the sample is substantially non-absorptive, such that any response can be attributed to the artifact and not to the intrinsic, unknown pattern of IR absorptivity of the remainder of the sample at such a test wavelength. The thermoelastic Green's functions for the sample at a variety of different frequencies of the applied time-varying IR illumination could then be determined based on a corresponding set of measurements of the displacement of the sample surface at various different locations across the surface and frequencies of applied time-varying illumination. These Green's functions can then be used to represent the 'forward model' of the sample and used to solve an 'inverse problem' to reconstruct the three-dimensional pattern of absorptivity throughout the sample at different wavelengths of applied IR illumination.

Figures 2A, 2B:
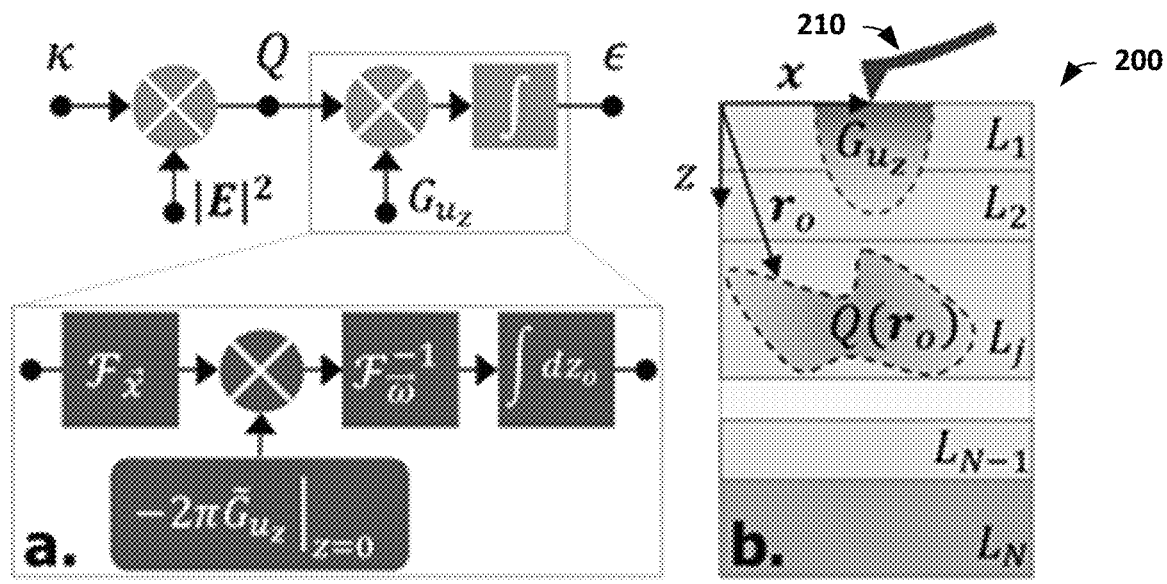
FIG. 2A illustrates element of a 3D IR tomography method, according to an example embodiment.
FIG. 2B, illustrates in cross-section, elements of a multilayer thermoelastic model of a sample, according to an example embodiment.

3D absorption imaging using AFM-IR (or other measurement techniques) can be facilitated by a precise understanding of such a "forward model" relating the pattern of 3D infrared absorption within the sample to the recorded AFM-IR signal: out-of-plane, stress-free surface expansion (or displacement). FIG. 2B depicts the relationship between a pattern of heating $Q(r_0)$ within a sample 200 (depicted as a multi-layer sample having stacked layers $L_1$ through $L_N$, as described in greater detail below). The displacement of the surface of the sample 200 in response to this heating is measured by a probe 210. The pattern, relative to the probe tip 210 within the sample 200, of the thermoelastic Green's function relating displacement of the sample 200 surface at the probe tip as a function of the pattern of heating within the sample (e.g., $Q(r_0)$) is depicted by $G_{u_z}$.

FIG. 2A depicts the complete forward model of AFM-IR as a block diagram. The forward model is primarily a relation between expansion at the sample surface ($\epsilon$) and 3D heat generation (Q). For photo-induced heating, as in the AFM-IR examples described herein, there can be additional complications relating to the electric field distribution in the sample. This can be related to the enhancement of the electric field in the vicinity of the AFM probe tip in examples where the probe is composed of gold or otherwise exhibits significant electrical field enhancement. In general, the AFM-IR forward model can be posed as follows:

$$\tilde{\epsilon}(\omega, s) = 2\pi \int_{106} \tilde{G}_\epsilon(|\omega|, z_o, s) \tilde{Q}(\omega, z_o) dz_o \quad (1)$$

where $\tilde{\epsilon}$ is the surface displacement as a function of location (in terms of spatial frequency $\omega$) and the complex variable s, $\tilde{Q}$ is the pattern of heat generation within the sample as a function of location (in terms of spatial frequency $\omega$) and depth $z_o$, and $\tilde{G}_\epsilon$ is the Green's function (relating the pattern of heat generation to surface displacement) as a function of location (in terms of spatial frequency $\omega$), the complex variable s, and depth $z_o$. This relationship is depicted in the spatial frequency domain (inset of FIG. 2A) for analytical and computational convenience.

FIG. 2B shows a schematic of the Green's function as a convolution filter under the tip of the cantilever with heat generation (Q) as the input. This convolution filter acts as a weighting function that defines the relative contribution of heating in 3D to the overall magnitude and phase of the displacement at the tip. Assuming the electric field is uniformly distributed resulting from direct illumination (an assumption that can be strengthened by providing IR illumination in a spot larger than the thermal diffusion length in the sample), we can define the following:

$$\tilde{G}_\epsilon(|\omega|, z_o, s) = -\tilde{G}_{u_z}(|\omega|, z, z_o, s)|_{z=0}, \quad (2)$$

$$\tilde{Q}(\omega, z_o) = \frac{4\pi}{\lambda_o}|\tilde{E}_o|^2 \tilde{\kappa}(\omega, z_o)$$

where $\tilde{\kappa}$ is the extinction coefficient of the sample material as a function of location (in terms of spatial frequency $\omega$) and depth $z_o$.

The electric field $\tilde{E}_o$ is a constant (owing to the uniformity of IR illumination in the region of the tip) and the expansion kernel $\tilde{G}_\epsilon$ is simply the thermoelasticity Green's function. The electric field can introduce an additional weighting function due to tip-enhanced electric field which is multiplied by the Green's solution in spatial coordinates. Note that, as described above, such tip-enhancement effects can be minimized or abolished entirely by employing non-enhancing probe materials (e.g., silicon and/or omitting gold or other field-enhancing materials) and/or by adding a layer of non-absorptive material on top of a sample such that there is substantially no IR absorption within the tip-proximate region of field enhancement. Additionally or alternatively, tip-enhancement can be mathematically accounted for in the forward model, as follows:

$$\tilde{G}_\epsilon(\rho, z_o, s) = -\left(\tilde{G}_{u_z}(\rho, z, z_o, s) + \tilde{G}_{u_z}(\rho, z, z_o, s) * \frac{|\tilde{E}_{tip}(\rho, z_o)|^2}{|E_o|^2}\right)\bigg|_{z=0}, \tilde{Q}(\omega, z_0) = \frac{4\pi}{\lambda_o}|\tilde{E}(\omega, z_o)|^2 \tilde{\kappa}(\omega, z_o). \quad (3)$$

The kernel is the sum of the direct illumination term and another term to account for tip-enhancement. Because the tip-enhanced field is multiplicative in the spatial domain, the frequency domain definition is a convolution of the Green's function with the tip enhancement factor. Assuming the direct illumination is very broad compared to the spread of the Green's function (again, an assumption that can be satisfied by providing IR illumination as a beam with a width larger than the spread of the Green's function), direct illumination can be assumed to have infinite extent. Thus, the electric field of direct illumination term would be a delta response in frequency domain and thus can be absorbed in the heating function $\tilde{Q}(\omega, z_o)$. The electric field can be separated into two fields: one that moves with the tip and one that moves with the sample.

The portions of the electric field that move with the tip are dimensionless functions: equal to 1 for direct and $$\frac{|\tilde{E}_{tip}(\rho, z_o)|^2}{|E_o|^2}$$

for tip-enhanced. The distribution of light in the sample, however, can vary spatially due to the optical properties of the sample. For instance, an IR absorbing bead would cast a "shadow" on material below producing a spatially-varying electric field that moves with the sample. Defining the electric field to vary spatially in this way can account for this effect. This suggests that absolutely accurate mapping of IR absorption requires a complete accounting for such shadow-like features. However, the embodiments described herein can provide a solution that is sufficient for practical circumstances by instead reconstructing the heating function Q (which is the product of the electric field distribution and the 3D absorption pattern within the sample).

For thin materials, these effects on electric field distribution can be assumed negligible (and thus the forward model simplified), but for thick samples, tip-enhancement effects can be accounted for in the forward model. For AFM-IR, the electric field within the dielectric material of the sample is of interest. Modeling of tip enhancement can range from simple dipole solutions to multi dipole spheroids to full numerical simulations. Herein, an "interacting dipoles" model is described and employed to solve for the electric field inside a dielectric half-space (representing the sample of interest) to represent the tip-enhancement field.

Figure 3:
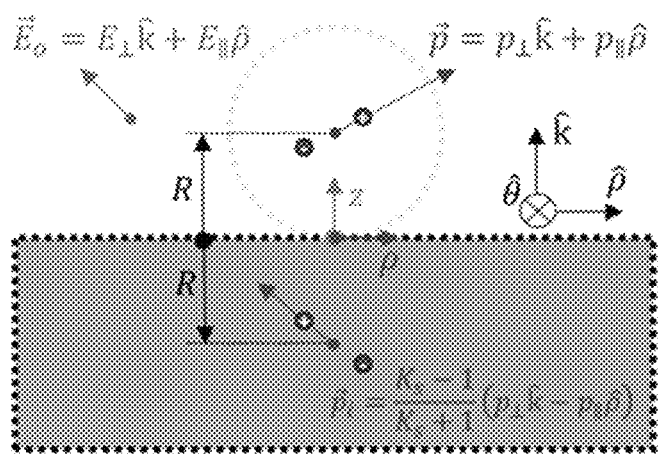
FIG. 3 illustrates an example model of tip enhancement, according to an example embodiment.

FIG. 3 shows the schematic of an applied uniform electric field $E_0$ interacting with a dielectric sphere (representing the field-enhancing tip of the probe). The applied electric field induces a dipole in the dielectric sphere which induces an image dipole in the half space as depicted in FIG. 3.

The dipole model of a sphere is an approximation. The exact electric field inside a uniformly polarized sphere is defined as follows:

$$\vec{E}(r, \theta) = \begin{cases} -\dfrac{1}{3\epsilon_o}\vec{P} & r < R, \\ -\nabla\left(\dfrac{1}{4\pi\epsilon_o}\dfrac{\vec{p}\cdot\hat{r}}{r^2}\right) & r \geq R, \end{cases} \quad (4)$$

Where $\vec{p} = \dfrac{4}{3}\pi R^3 \vec{P}$.

A uniform polarization results in a uniform electric field inside the sphere. By the definition of a linear dielectric, an applied, uniform electric field would also produce a uniform polarization. Thus, the exact polarization of a sphere in a uniform electric field can be determined using recursion. The solution is thus:

$$\vec{P} = \dfrac{\epsilon_o \chi_t}{1 + \dfrac{\chi_t}{3}}\vec{E}_o. \quad (5)$$

The total electric field in and outside the sphere is thus the sum of the applied electric field and the field produced by the polarized sphere. Note, the field outside the sphere is identical to the field produced by a point dipole located at the center of the sphere. This solution is exact subject to the assumption that the electric field is uniform. For an AFM tip irradiated by IR light, at any given time, the applied electric field can be assumed to be spatially uniform since the tip radius is much smaller than the wavelength of light. Thus, for a small sphere, this solution is rigorous. However, to represent the sample of interest, a linear dielectric half space is introduced to interact with the sphere response. In the presence of such a dielectric half space, the electric field inside the sphere is no longer uniform and the recursive solution approach breaks down. In this case, a sophisticated integral solution can be employed. Alternatively, an approximation which can be more easily solved can be used. One approximation is to model the sphere as a point dipole. A point dipole adjacent to a dielectric half space induces an image dipole equidistant from the surface with known scaling. To determine how an applied, uniform electric field induces sphere and image dipoles, we first define the sphere dipole as follows:

$$\vec{p} = \alpha_t(\vec{E}_o + \vec{E}_{\vec{p}_i})|_{@\vec{p}}. \quad (6)$$

$$\alpha_t = 4\pi R^3 \epsilon_o \dfrac{K_t - 1}{K_t + 2}$$

$\alpha_t$ is known as the sphere polarizability, $K_t$ is the dielectric constant of the sphere (field-enhancing AFM probe tip), $\vec{E}_o$ is the applied electric field and $\vec{E}_{\vec{p}_i}$ is the electric field of the image dipole at the sphere dipole location. The polarization of the sphere dipole is equal to the polarizability times the total electric field seen by the sphere dipole (i.e. the sum of the applied and image dipole fields). Next, a relation between the image and sphere dipoles can be developed. Consider the relation of a point charge next to a dielectric half space. This scenario produces an image point charge in the half space with charge scaled by $$\dfrac{K_s - 1}{K_s + 1}$$

where $K_s$ is the dielectric constant of the substrate (half space). A dipole can be considered a positive and negative point charge which are infinitesimally close as shown in FIG. 3. Thus, the image can be related to the sphere dipole as follows:

$$\vec{p}_i = \dfrac{K_s - 1}{K_s + 1}(p_\perp \hat{k} - p_\parallel \hat{\rho}). \quad (7)$$

Applying this relation to equation (6), the sphere polarization can be defined as follows:

$$\begin{bmatrix} p_\perp \\ p_\parallel \end{bmatrix} = \begin{bmatrix} \alpha_\perp & 0 \\ 0 & \alpha_\parallel \end{bmatrix} \begin{bmatrix} E_\perp \\ E_\parallel \end{bmatrix} \quad (8)$$

$$\alpha_\perp = \dfrac{\alpha_t}{1 - \alpha_t \alpha_s} \quad \alpha_\parallel = \dfrac{\alpha_t}{1 - \dfrac{\alpha_t \alpha_s}{2}}$$

$$\alpha_t = 4\pi R^3 \epsilon_o \dfrac{K_t - 1}{K_t + 2} \quad \alpha_s = \dfrac{1}{16\pi\epsilon_o R^3}\beta \quad \beta = \dfrac{K_s - 1}{K_s + 1}.$$

This relation describes the magnitude of the sphere dipole adjacent to a dielectric half space which is induced by an applied electric field. We can use this to define the electric field of the sphere and image dipole system. The electric field potential of a pure, point dipole can be defined as follows:

$$V_\perp^{dip}(r^*, z^*) = \dfrac{p_\perp}{4\pi\epsilon_o}\dfrac{z^*}{(r^{*2} + z^{*2})^{\frac{3}{2}}}. \quad (9)$$

The electric field of a point dipole near a dielectric half space is a piecewise solution depending on the side of the surface. The potential field inside the half space can be defined as follows:

$$V\perp(r, z) = (1-\beta)V_\perp^{dip}(r, z+R+t). \quad (10)$$

The electric field potential is a scaled, shifted pure dipole potential. Applying definitions of the potential field, the p-polarized electric field intensity inside the half space can be defined as follows:

$$|\vec{E}|^2 = \left| \frac{8\left(\frac{K_t-1}{K_t+2}\right)E_\perp(1-\beta)}{4-\left(\frac{K_t-1}{K_t+2}\right)\beta} \right|^2 \frac{R^6}{4} \frac{(r^2+4(z+R)^2)}{(r^2+(z+R)^2)^4}. \quad (11)$$

Figure 4:
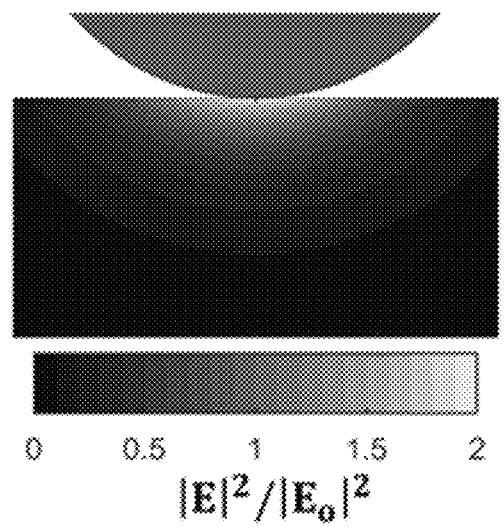
FIG. 4 depicts simulation results for electric field enhancement proximate to an AFM probe tip, according to an example embodiment.

This function describes the field intensity inside a dielectric material next to a p-polarized sphere (representing the tip-enhanced electric field). The s-polarized field is assumed to be effectively zero. FIG. 4 shows the tip-enhanced electric field intensity inside a PMMA half space, determined as described above with a gold sphere of radius 20 nm and an illumination wavelength of 1732 cm$^{-1}$.

The predicted field intensity is smaller than typically predicted for a number of reasons. For example, the field intensity inside the half space is much smaller than the field in between the sphere and a surface typical of gold coated mirrors. This accounts for at least an order of magnitude of the difference. Additionally, a point dipole cannot model the extreme gradients of the local electric field. Spheroid models with multiple dipoles or full numerical simulations are more accurate and can include both plasmonic resonance as well as resonance due to the geometry of the tip which can be achieved by solving Helmholtz equations coupled to accurate tip geometries. Although a point dipole does not replicate those effects, the actual field enhancement can be approximated by allowing for independent adjustment of the scaling and radius of the tip enhancement. The following definition for the tip enhancement can be used:

$$|\vec{E}|^2/|\vec{E}_o|^2 = A \frac{(r^2+4(z+R)^2)}{(r^2+(z+R)^2)^4}. \quad (12)$$

The sphere electric field profile is adopted with two arbitrary parameters, A and R, for adjusting the magnitude and radius of this effect. This is an approximation of the effects of tip-enhancement and does not represent an exact solution; however, this approach allows for the effects of tip enhancement in terms of resolution enhancement and depth dependence to be modeled.

The recorded AFM-IR signal can be modeled using the tip-enhancement formula of equation (12) combined with the Green's function formulation of equations (1) and (3). To capture the relevant physics, a sample with spatial frequencies higher than the spatial bandwidth of the Green's function can be interrogated, such as a sample that contains an IR-absorbing bead or a sharp edge. Sharp polymer edges can be prepared out of thin PMMA polymer films by floating the films on water and then transferring the film(s) to a substrate. Applying an 8 nm thick polymer film directly to a substrate like silicon, however, would likely result in a very high spatial bandwidth (on the order of the edge thickness) in the response signal. To capture the physical response of the Green's function, it is preferable to apply the test artifact (e.g., PMMA or other film) to a substrate that exhibits greater thermal and stress diffusion effects when combined with the sharp polymer film sample in order to provide reliable validation of resolution and frequency dependence of the Green's function. For example, an 8 nm thick polymer film with a sharp edge (torn) was applied to a 500 nm SU8 coated barium fluoride substrate. This test sample was prepared twice, once with an additional top-coating of 500 nm of SU8 to submerge the edge in order to obtain depth information, and once without such an additional top-coating. These samples were then used to measure the edge spread function (ESF) of surface and submerged materials.

Figure 5:
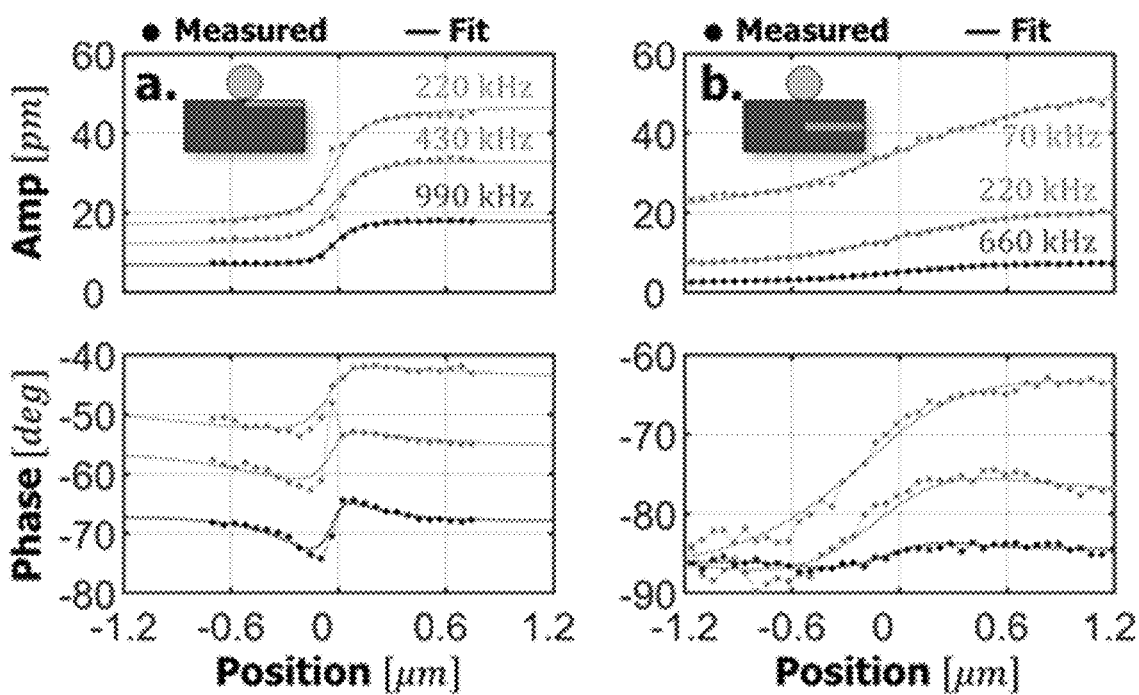
FIG. 5 depicts simulation results, according to an example embodiment.

FIG. 5 depicts the amplitude and phase of the surface expansion of these test samples in response to time-varying heating thereof at three selected frequencies. Panel 'a' of FIG. 5 shows the ESF fit based on measured AFM-IR signals for the 8 nm edge on the top surface (i.e., the sample that did not also include the SU8 top-coating above the edge artifact). Panel 'b' of FIG. 5 shows the ESF fit for the test sample containing the 8nm PMMA edge submerged beneath an additional 500 nm of SU8.

The ESF for absorbers near the tip exhibited enhanced resolution beyond the Green's function alone. The resolution of the fits shown here was enhanced by adjusting the tip-enhancement model described above. The signal may have additionally been enhanced over the PMMA film due to interface conductance between the PMMA and SU8. Additionally, the presence of the PMMA film could have enhanced the local thermal expansion of the signal, which could produce an effectively 'instantaneous' change in the expansion. Any one or more of these effects could be modeled to produce a more accurate fit to the observed data. Panel 'b' of FIG. 5, in contrast, shows that the observed ESF response was accurately modeled without tip-enhancement or any of the other described effects.

Figure 6A:
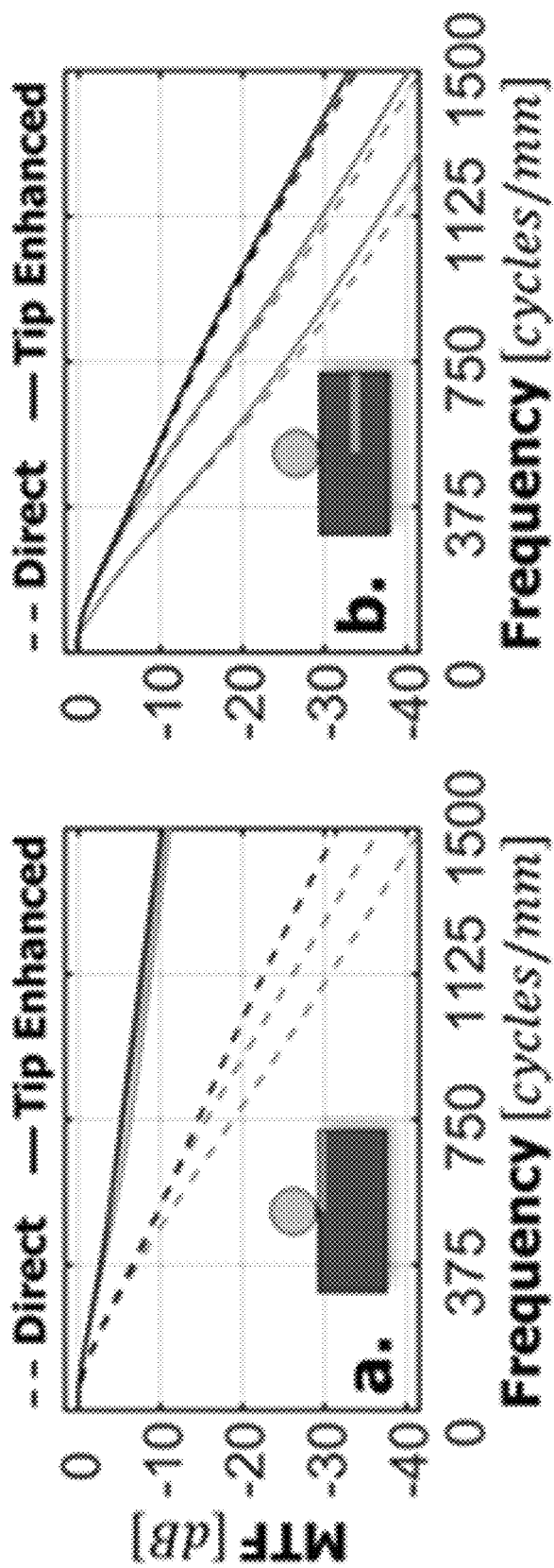
FIG. 6A depicts simulation results, according to an example embodiment.

FIG. 6A depicts the modulation transfer function (MTF) for each of the test samples, which was derived from the determined ESF curves. Panel 'a' of FIG. 6A shows the MTF for the sample having the test edge on the surface, and panel 'b' shows the MTF for the submerged-surface sample. The measured MTF for the 'tip-enhanced' sample (i.e., the sample having the test edge on the surface, and thus close enough to the probe tip for tip-enhancement effects to reach the edge) has enhanced resolution nearly double that expected from direct illumination alone (i.e., if there was no tip enhancement of the electric field). In contrast, the measured MTF is virtually identical to direct illumination alone for the 'submerged' edge sample, suggesting that submerged absorbers can be accurately modeled using the thermoelastic Green's function alone.

As shown in FIG. 6A, the MTF fit in the presence of tip-enhancement exhibits enhanced contrast when compared to direct illumination alone. This indicates improved resolution for surface absorbers; however, all the measured frequencies appear to have nearly identical profiles. Such a lack of distinction in frequency measurements reduces ability to resolve depth-related information. Panel 'b' of FIG. 6A shows the MTF curves for the PMMA edge submerged beneath the additional 500 nm of SU8. For that sample, both the fit modeling tip-enhancement and the fit omitting tip-enhancement (direct illumination alone') produce approximately the same result, demonstrating that submerged material can be accurately modeled using the thermoelastic Green's function without modification to account for tip enhancement effects. Submerged material also appears to be imaged at relatively lower resolution; however, unlike surface material, the MTF plots exhibit frequency dependence. This frequency dependence can be used, as described herein, to facilitate the generation of 3D tomographic data about the IR absorption characteristics throughout the volume of samples at varying depths within the samples. To achieve the highest resolution for thin samples, it is beneficial to section material placed near the tip to benefit from the tip-enhanced resolution. However, for thick materials, the signal is a mixture of all material beneath the tip, without any depth-related information that can be leveraged to generate 3D tomographic absorption data.

Figure 6B:
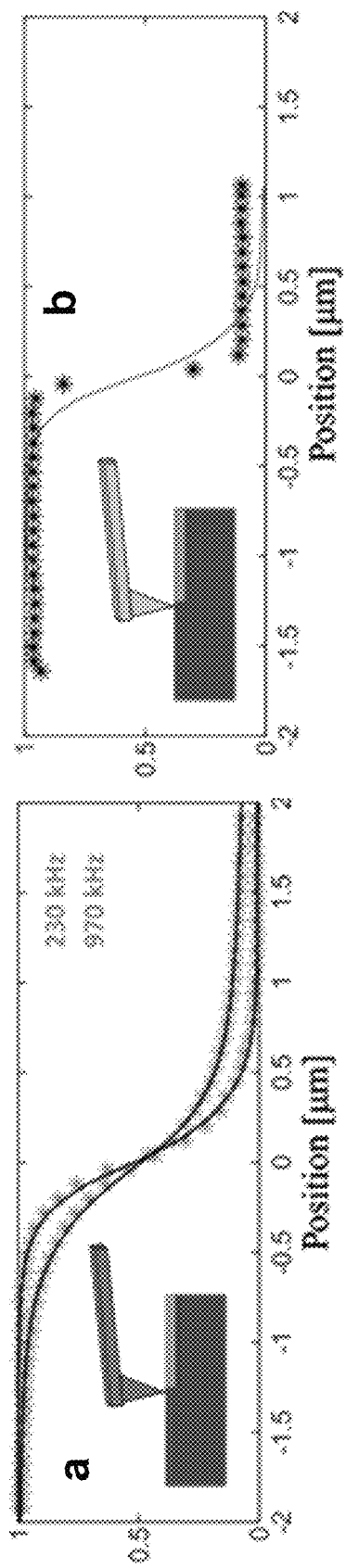
FIG. 6B depicts simulation results, according to an example embodiment.

Thus, it is beneficial to record distinct, frequency dependent signals (e.g., signals that are not significantly affected by tip enhancement effects) in order to distinguish between materials in different layers. A described herein, the effects of tip-enhancement can be reduced by applying an additional substantially non-absorptive top layer (e.g., of SU8) to the samples, by using probe materials or geometries that exhibit no or minimal tip enhancement (e.g., silicon probe tips, probe tips that lack gold or other highly IR-interactive materials), or by taking some other measure to reduce tip enhancement. FIG. 6B illustrates the effects on edge spread and frequency dependence of the presence of gold (and its associated tip enhancement) on an AFM probe. Panel 'a' of FIG. 6B shows the edge spread response (and Green's function fit thereto, not modeling tip enhancement) for a silicon ATEC probe at two different frequencies of time-varying IR illumination. Panel 'b' of FIG. 6B shows the edge spread response (and Green's function fit thereto, not modeling tip enhancement) for a gold coated ATEC probe.

Figures 7, 8:
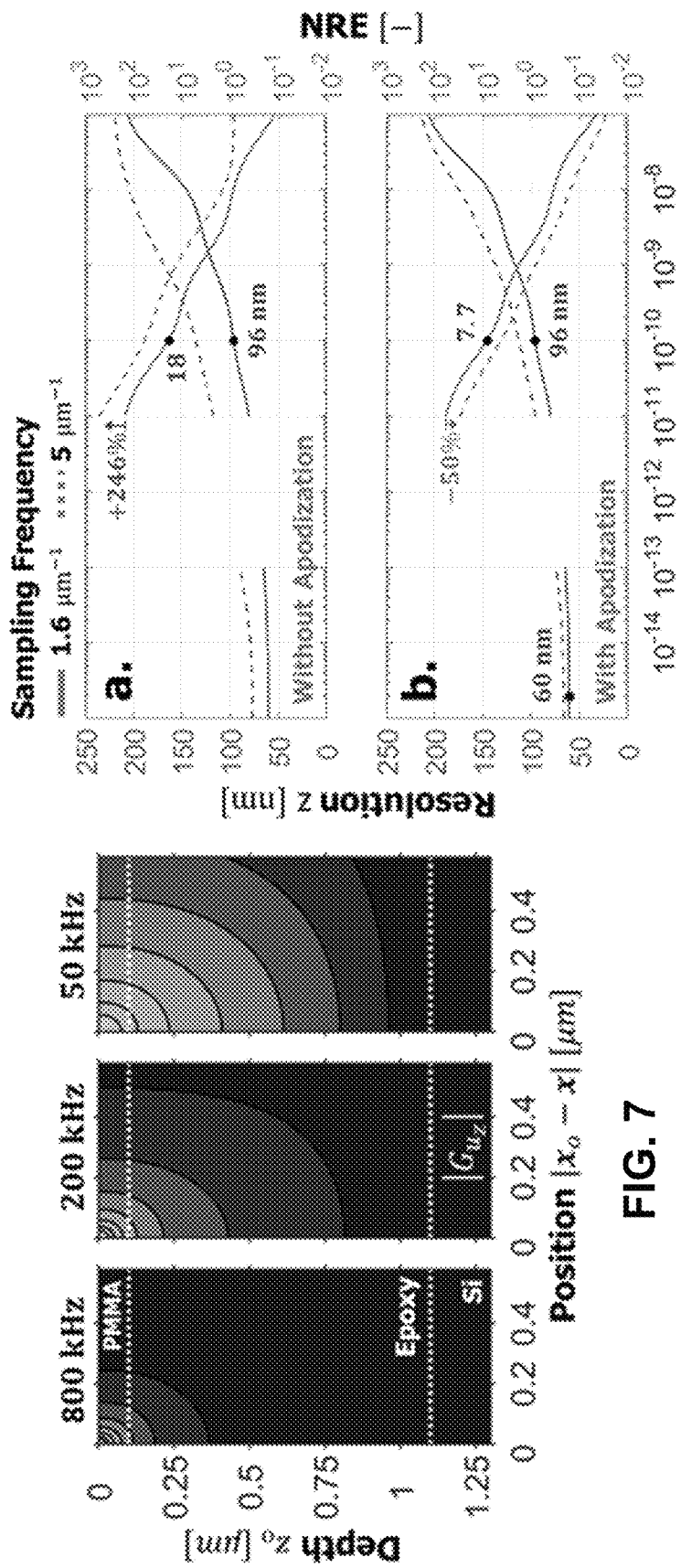
FIG. 7 depicts simulated thermoelastic Green's functions, according to an example embodiment.
FIG. 8 depicts simulation results, according to an example embodiment.

Reducing or eliminating tip enhancement effects allows for the detection of frequency-dependent signals that can be accurately modeled by the thermoelastic Green's function. FIG. 7 shows the thermoelastic Green's function ($G_{uz}$) in spatial coordinates for 3 different frequencies of time-varying infrared illumination of a three-layer sample composed of a layer of PMMA formed on a layer of epoxy that is, in turn, disposed on a silicon substrate. The magnitude of the function in each plot is normalized to the value at [x,z]=[0,0].

The Green's function exhibits larger spatial spread at lower frequencies related to increased thermal diffusion of the photo-induced heating. This results in a large "volume" of absorbing material which affects the expansion local to the AFM tip, characterized by the increased spatial extent of the Green's function. This spread of signal is approximately isotropic but begins to increase laterally for larger diffusion lengths in this example. Photo-induced heating of material in close proximity to the highly thermally conductive Silicon substrate is quenched regardless of frequency and has little influence over the expansion of the surface. This stops the spread of the Green's function vertically, but does not restrict lateral diffusion of signal thus explaining the changing aspect ratio of the Green's function at lower frequencies. Regardless, there is a clear coupling between depth and frequency which can be utilized in the form of an inversion algorithm or via other methods as described herein to recover useful depth information to enable three-dimensional IR absorption tomography throughout the volume of a sample.

Thus, frequency dependent AFM-IR images (e.g., sets of AFM-IR measurements taken in response to illuminating a sample with IR illumination that varied at different frequencies) can be used to develop an inversion approach to recover 3D absorption data throughout the volume of samples, at varying depths within the samples. For ill-conditioned forward problems such as with AFM-IR, an estimate of the 3D absorption can be determined that minimizes some metric with respect to the recovered solution. For example, least squares minimization of the estimate and underlying signal. Some form of regularization such as Tikhanov regularization can also be applied for improved stability of the inversion method. An approach known as the Backus-Gilbert method or the Optimally Localized Average (OLA) method can reduce the resolution or spatial spread between the estimated tomographic IR absorption field and the ground truth thereof. This approach can be applied to forward problems of 1D integrals and can be applied to the frequency domain definition of the AFM-IR forward model provided elsewhere herein. While the OLA inversion method or other inversion methods can be applied to the models described herein that account for tip-enhancement, the description below applies the OLA inversion method to versions of the AFM-IR forward model that ignore the effects of tip-enhancement.

The OLA method is an approach for inverting 1D integrals with parameter-dependent kernels. The general form of the forward model can be written as follows:

$$\tilde{g}_i(k) = \int_\Omega \tilde{K}_i(k, z_o) \tilde{Q}(k, z_o) dz_o + \tilde{e}_i. \quad (13)$$

where, $\tilde{g}_i(k)$ is the ith measurement with a different depth-sensitive parameter (e.g., a different frequency of illumination i), $\tilde{K}_i(k, z_o)$ is the forward problem kernel response for the ith measurement, and $\tilde{Q}(k, z_o)$ is the underlying target function (i.e., the three-dimensional pattern of heating within the sample, which can be used to infer the three-dimensional pattern of IR absorptivity at the relevant wavelength of IR illumination used to generate the source data). For this algorithm, these functions depend on spatial frequency k and depth $z_o$; this formulation is provided due to the ease with which it can be analytically and/or computationally solved. The term $\tilde{e}_i$ represents the noise of the measurement and is assumed to be constant with respect to k (i.e. white random noise in the spatial domain). Given the rigorous definition of the AFM-IR forward model provided herein, the following can be defined:

$$\tilde{g}_i(k) = s_i \tilde{\epsilon}(k, s_i),$$

$$\tilde{K}_i(k, z_o) = -2\pi s_i \tilde{G}_{u_z}(\|k \odot \Delta\omega\|, 0, z_o, s_i). \quad (14)$$

AFM-IR measurements are defined in terms of their frequency scaled, complex-valued expansions. The functions are defined in the spatial frequency domain in order to provide a 1D integral form. The kernel definition follows from this definition combined with the AFM-IR forward model. Note that the AFM-IR measurement may be subject to gain and bias effects that vary with index i, which corresponds to the frequency of the time-variation of the applied IR illumination. These aspects of the AFM measurement process can be modeled in order to account for their effects on the measurements as follows:

$$\tilde{g}_i = G_i \tilde{\epsilon}(k, s_i) + b_i. \quad (15)$$

Here, $G_i$ and $b_i$ are arbitrary, complex-valued gain and bias parameters that vary with index i. Thus, data sets $\tilde{g}_i$ can be pre-processed to isolate the expansion signal $\tilde{\epsilon}(k, s_i)$ such that the Green's function more accurately predicts the observed measurement. This preprocessing can include first, because the bias is substantially constant with respect to spatial frequency k, subtracting the mean value from each $i^{th}$ dataset. This will result in a mean subtracted signal equal to $\tilde{g}^*_i = G_i(\tilde{\epsilon}(k, s_i) - \tilde{\epsilon}(0, s_i))$. Secondly, this mean subtracted signal can be normalized against the next-highest spatial frequency value to correct for the gain $G_i$.

The first step in the OLA method is definition of an estimate for $\tilde{Q}(k, z_o)$, defined as follows:

$$\tilde{Q}_E(k, z') = \Sigma_i \tilde{A}_i(k, z') \tilde{g}_i(k). \quad (16)$$

The estimate $\tilde{Q}_E(k, z')$ is a linear sum of the measurements multiplied by inverse polynomials $\tilde{A}_i(k, z')$. Thus, a definition for these polynomials is sought that minimizes or otherwise reduces the resolution of the estimate. Equation (13) can be applied to eliminate the measurement terms $\tilde{g}_i(k)$, resulting in the following:

$$\tilde{Q}_E(k, z') = \int_\Omega \tilde{R}(k, z', z_o) \tilde{Q}(k, z_o) dz_o + \tilde{E}(k, z'). \quad (17)$$

The resolution kernel $\tilde{R}(k, z', z_o)$ defines the spatial extent of the estimate's blur relative to the underlying 'ground truth' target function. For example, a resolution kernel equal to a Dirac delta function would admit an exact estimate of the target function. In addition to the resolution kernel, an error kernel $\tilde{E}(k, z')$ characterizes both random and bias error. Both these functions are defined as follows:

$$\tilde{R}(k, z', z_o) = \Sigma_i \tilde{A}_i(k, z') \tilde{K}_i(k, z_o)$$

$$\tilde{E}(k, z') = \Sigma_i \tilde{A}_i(k, z') \tilde{e}_i \quad (18)$$

It is beneficial to minimize or otherwise reduce the spread of the resolution. However, to do so, the levels of noise associated with the error kernel are also increased. The OLA method is designed to permit balancing of these effects through regularization. To do so, the traditional OLA method can be applied in this example to the z dimension only. To do this, the spread of the resolution kernel in the z dimension can be defined as follows:

$$S(k, z', q) = \int_\Omega |(z'-z_o)^q \tilde{R}(k, z', z_o)|^2 dz_o. \quad (19)$$

This definition applies to complex valued signals as is the case here. By inspection of equation (17), a Dirac delta function with respect to $z'-z_o$ would result in an exact reconstruction of the target function. By the definition of (19), this would result in zero spread. In fact, the spread definition here is strictly positive, thus for ill-posed problems, minimizing this value allows for optimal resolution. "Resolution" in this case only considers the spread with respect to depth within the sample; however, because the kernel is isotropic, it is assumed that this definition also provides a near minimum 3D spread. In addition to the spread definition, a constraint on the resolution kernel is also defined as follows:

$$\int_\Omega \tilde{R}(k, z', z_o) dz_o = 1. \quad (20)$$

This definition is chosen in order to allow for an exact reconstruction (Dirac delta); however, such an exact estimate is only possible in special cases. Regardless, this definition is useful and is modified below using apodization. Because the spread is defined separately for every spatial frequency and depth, a separate minimization problem can be solved independently for each spatial frequency and depth using the OLA approach. By minimizing or otherwise reducing the z spread for each position (spatial frequency and depth), something approximating a global minimum can be determined. Applying the resolution kernel definition to the spread and constraint results in the following:

Minimize $S(k, z', q) = \Sigma_i \Sigma_j \tilde{A}_i(k, z') W_{ij}(k, z') \tilde{A}^*_j(k, z)$, (21)

Constraint $\Sigma_i \tilde{A}_i(k, z') \tilde{R}_i(k) = 1$. (21)

Here, the spread matrix $\tilde{W}_{ij}$ and normalization vector $\tilde{R}_i$ of the OLA method are defined as follows:

$$\tilde{W}_{ij}(k, z') = \int_\Omega (z'-z_o)^{2q} \tilde{K}_i(k, z_o) \tilde{K}^*_j(k, z_o) dz_o,$$

$$\tilde{R}_i(k) = \int_\Omega \tilde{K}_i(k, z_o) dz_o. \quad (22)$$

Optimizing for resolution alone, however, can produce unstable reconstruction results. An additional term can be included to minimize the random error of the estimate associated with noisy measurements. The variance of the estimate is defined as follows:

$$\text{Var}(\tilde{Q}_E(k, z')) = \Sigma_i \Sigma_j \tilde{A}_i(k, z') \tilde{S}_{ij} \tilde{A}^*_j(k, z') \quad (23)$$

where, $\tilde{S}_{ij}$ is the covariance matrix of the error term $\tilde{e}_i$. Combining this into the minimization problem, the inverse polynomials can be determined as follows:

$$\tilde{A}_i(k, z') = \frac{\sum_j \tilde{M}^{-1}_{ij}(k, z') \tilde{R}_j(k)}{\sum_a \sum_b \tilde{R}_a(k) \tilde{M}^{-1}_{ab}(k, z') \tilde{R}_b(k)}, \quad (24)$$

$$\tilde{M}_{ij}(k, z') = \tilde{W}_{ij}(k, z') + \lambda^2 \sigma_m^2 \tilde{S}_{ij}.$$

The parameters $\lambda$ and q are two adjustable terms that can be used to adjust the tradeoff between resolution and noise. Note, the spread matrix is sometimes written as the product of a matrix times in conjugate transpose ($\tilde{W}_{ij} = K_{ij} K^*_{ji}$). The matrix $K_{ij}$ can be derived by splitting the spread into two separate matrices and equals the sampled kernel function times the quadrature weighting times sampled distance function $(z'-z_o)^q$. The singular values of the spread matrix equal the square of the singular values of the matrix $K_{ij}$. In this case, the covariance matrix is identical to Tikhanov regularization for constant measurement noise. Further, $\lambda$ has been scaled by the largest singular value of matrix $K_{ij}$ for all z and k defined as $\sigma_m$, which is typical for Tikhanov regularization.

This general form provides an optimal solution with an adjustable trade-off between resolution and noise. However, this solution only accounts for resolution spread in the z dimension. Indeed, the pseudo inverse of $\tilde{M}_{ij}^{-1}(k, z')$ at very large and very small values of k and z' is ill-conditioned and can result in large instabilities regardless of the choice of $\lambda$. As a result, changing the spatial sampling frequency of the measurement can produce varying levels of noise. Consider the variance of the estimate (or variance of the error kernel) assuming constant measurement random error (noise) and zero bias error defined as follows:

$$\text{Var}(\tilde{Q}_E(k, z')) = \sigma^2 \Sigma_i |\tilde{A}_i(k, z')|^2$$

The term on the right grows to infinity in the limit as $|k|$ goes to infinity. Thus, introducing more data at higher spatial frequency information results in increased noise which is a common problem with resolution enhancement algorithms such as Weiner deconvolution. Ideally, the noise power spectra could be restricted to be white noise, which can be achieved with an appropriate apodization function.

An apodization function can be incorporated into the inversion analysis above in order to address these issues. The uncontrolled growth of signal at large spatial frequencies and depths occurs due to the choice of normalization of the resolution kernel. Constraining the integrated value of the resolution kernel equal to one introduces a scaling which grows with spatial frequencies, allowing for an improved delta kernel response. Instead of constraining the resolution kernel equal to one, an arbitrary function $f(k, z')$ can be introduced that can then be renormalized as a function of spatial frequency and depth as follows:

$$\int_\Omega \tilde{R}(k, z', z_o) dz_o = f(k, z'). \quad (25)$$

Replacing the previous definition with the above results in the following:

$$\tilde{A}_i(k, z') = f(k, z') \frac{\sum_j \tilde{M}^{-1}_{ij}(k, z') \tilde{R}_j(k)}{\sum_a \sum_b \tilde{R}_a(k) \tilde{M}^{-1}_{ab}(k, z') \tilde{R}_b(k)}. \quad (26)$$

Thus, the function $f(k, z')$ acts to apodize the estimate output as a function of spatial frequency and depth. This allows for flattening/bounding the noise of the estimate. Assuming constant noise, the variance of the estimate can be defined as follows:

$$\text{Var}(\tilde{Q}_E(k, z')) = \sigma^2 \left| f(k, z') \frac{\sum_j \sum_i \tilde{M}_{ij}^{-1}(k, z')\tilde{R}_i(k)}{\sum_a \sum_b \tilde{R}_a(k)\tilde{M}_{ab}^{-1}(k, z')\tilde{R}_b(k)} \right|^2 \quad (27)$$

This result does not provide a smooth definition for f(k, z') since the pseudo inverse of the spread matrix is not smooth with respect to spatial frequencies. Thus, it is beneficial to bound the variance by splitting the denominator as follows:

$$\text{Var}(\tilde{Q}_E(k, z')) \leq \sigma^2 \left| \frac{f(k, z')}{\sum_a \tilde{R}_a(k)} \frac{\sum_j \sum_i \tilde{M}_{ij}^{-1}(k, z')\tilde{R}_i(k)}{\sum_a \sum_b \tilde{M}_{ab}^{-1}(k, z')\tilde{R}_b(k)} \right|^2. \quad (28)$$

This result follows from some Chebyshev sum inequality. The double sums on the right cancel leaving a simple noise bound. The apodization can be defined as follows:

$$f(k, z') = \frac{\sum_a \tilde{R}_a(0)}{\sum_a \tilde{R}_a(k)}. \quad (29)$$

This solution provides a relatively smooth, spatial lowpass filter normalized such that the DC level is unchanged. With this definition, the random estimate error will have a relatively flat frequency response allowing for arbitrary sampling. This completes the OLA algorithm for the 1D resolution spread. Code implementing this inversion algorithm, as function inverse_nd_zdisp(), is provided in the appendix.

One benefit of the OLA method is the adjustable trade-off between resolution and SNR which can be determined without measured data. This trade-off can be arbitrarily adjusted using the regularization parameter $\lambda$ and the spread parameter q. The effects of the regularization parameter are described below. Additionally, because the z resolution is minimized/reduced above, this analysis will only consider depth resolution. The depth resolution can be defined as the square root of the variance of the resolution kernel defined as follows:

$$R_z = \sqrt{\frac{\sum_k \sum_{z_o} (z' - z_o)^2 |R(k, z', z_o)|}{\sum_k |f(k)|}}. \quad (30)$$

This metric characterizes the variance of the resolution kernel in the $z_o$ about the z' mean value. Because the apodization function acts as a weighted sum, this definition normalizes according to the sum of the weighting values (or the sum of the apodization function f). Additionally, because the resolution kernel can be complex valued, the absolute value which characterizes magnitude of signal is analyzed. In addition to resolution, a metric that characterizes random error can be defined as follows:

$$NRE = SNR_g \frac{\sqrt{\frac{1}{N}\sum_k \sum_i \sigma_i^2 |\tilde{A}_i(k, z')|^2}}{Q_o}. \quad (31)$$

The normalized random error (NRE) defines the amplification of the random error of the measurement signal g. The numerator is the square root of the spatial-frequency averaged variance of the error kernel which defines the random error (noise) of a single pixel of the estimate in units of heat generation. This noise is normalized by the 'signal,' which is defined as $Q_o$, equivalent to the inverse of the SNR of the estimate. This metric Is then scaled by the SNR of the underlying measurement signal $SNR_g$. Thus, an NRE equal to 1 results in an estimate SNR equal to the measurement SNR. FIG. 8 panel 'a' shows the resolution and NRE metrics versus the regularization parameter $\lambda$ without apodization for a 500 nm thick sample, while panel 'b' shows this result with apodization. Increasing the spatial sampling frequency of the simulation increases the noise by 246% with little resolution benefit for the non-apodized case, while the addition of apodization allows for noise reduction by 50% with the increase spatial sampling frequency. There is an overall tradeoff between resolution and noise.

Increasing the spatial sampling frequency results in a 246% in NRE with little resolution benefit. This is due to the increased amplification of signal at higher spatial frequencies which also increases the noise. The purpose of apodization is to ensure a flat noise spectrum to avoid this effect. The additional of apodization results in a 50% reduction in NRE with increased spatial sampling frequency. Ideally, an apodization function is selected that maintains constant NRE by tightly bounding the noise spectrum. In the example illustrated herein, the bound is a conservative estimate resulting in reduced noise at higher spatial frequencies. Further, apodization has little influence on depth resolution; however, the lateral resolution is affected. The depth resolution can reach near 60 nm (for a 500 nm thick sample) for an error-free measurement with zero regularization. The depth resolution appears to be about ⅕ the total sample thickness for reasonable levels of SNR. The effects of other parameters such as sample thickness, depth and frequency can improve these fundamental limits.

The tradeoff between resolution and noise with the OLA method provides a clear approach to estimate resolution limits of AFM-IR. Unlike thin samples which provide simple resolution estimates that scale with sample thickness, the resolution of thick samples requires the depth resolving capabilities of an inverse approach such as OLA to quantify resolution. For instance, the spread of the forward response of a submerged object similar to the thin sample could be simulated; however, such a simple method would discard the additional information contained in the frequency information that allows for distinction between different depths. The resolution across different conditions considering noise, sample depth and sample thickness is develop below.

Figure 9:
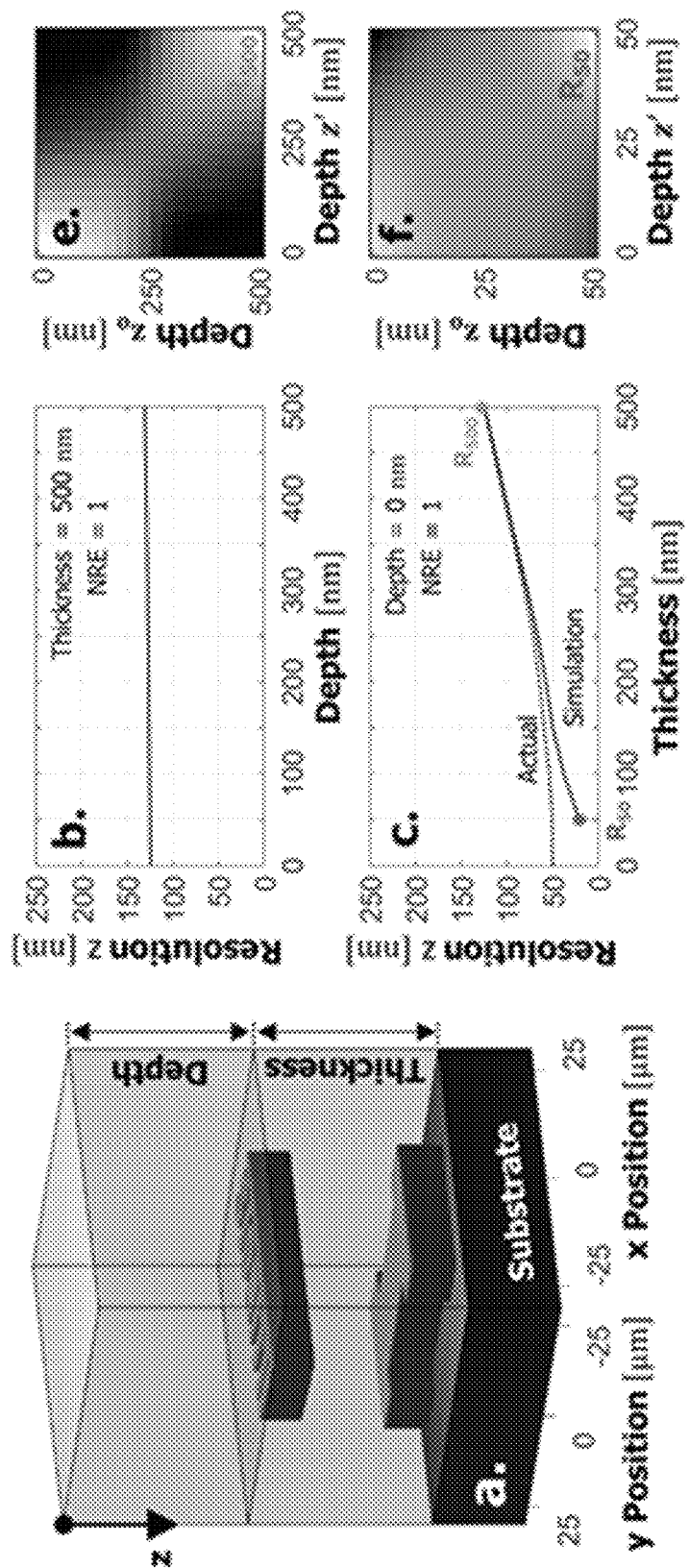
FIG. 9 depicts results and elements of a simulation, according to an example embodiment.

Panel 'a' of FIG. 9 shows the schematic of the heat generation function with variable depth and thickness used for simulating resolution limits. The lateral dimension and vertical aspect ratio of the sample is fixed with respect to thickness (i.e. the thickness of the "Illinois" is ¼ the total thickness). Panel 'b' of FIG. 9 shows the depth resolution as a function of submerged depth for sample thickness of 500 nm and NRE equal to 1. By maintaining constant NRE, the noise was fixed resulting in an effective "normalized" resolution limit. As shown, the depth resolution is unaffected by the depth of the sample. Submerged material exhibited increased lateral blurring of expansion measurements; however, the depth resolution depends on the difference between measurements at different time-varying frequencies of IR illumination. This difference is relatively invariant with depth resulting in substantially constant depth resolution.

Increasing depth affects the lateral resolution of the estimate. Panel 'c' of FIG. 9 shows the depth resolution as a function of sample thickness for depth and NRE equal to 0 nm and 1 respectively. The resolution improves linearly with reduced thickness; however, this response likely exhibits a plateau at some thickness level, based on the results of the thin sample resolution analysis. The reason the simulation here suggests infinitesimal depth resolution at zero thickness likely results from inaccurate resolution estimates owing to the discrete sampling of the resolution kernel. Panel 'e' of FIG. 9 shows the resolution kernel for the 500 nm thick sample. The variance of the resolution kernel along the $z_o$ dimension provides an accurate estimate of depth resolution because of the highly diagonal nature of the matrix; however, panel 'f' of FIG. 9 is more uniform. In this case, the simulated variance likely exhibits some inaccuracy due to the resolution kernel having been under sampled, introducing a sharp cutoff at 50 nm. The true variance of the resolution exceeds this cutoff but is not adequately quantified by the depth resolution metric of equation (30).

Figure 10:
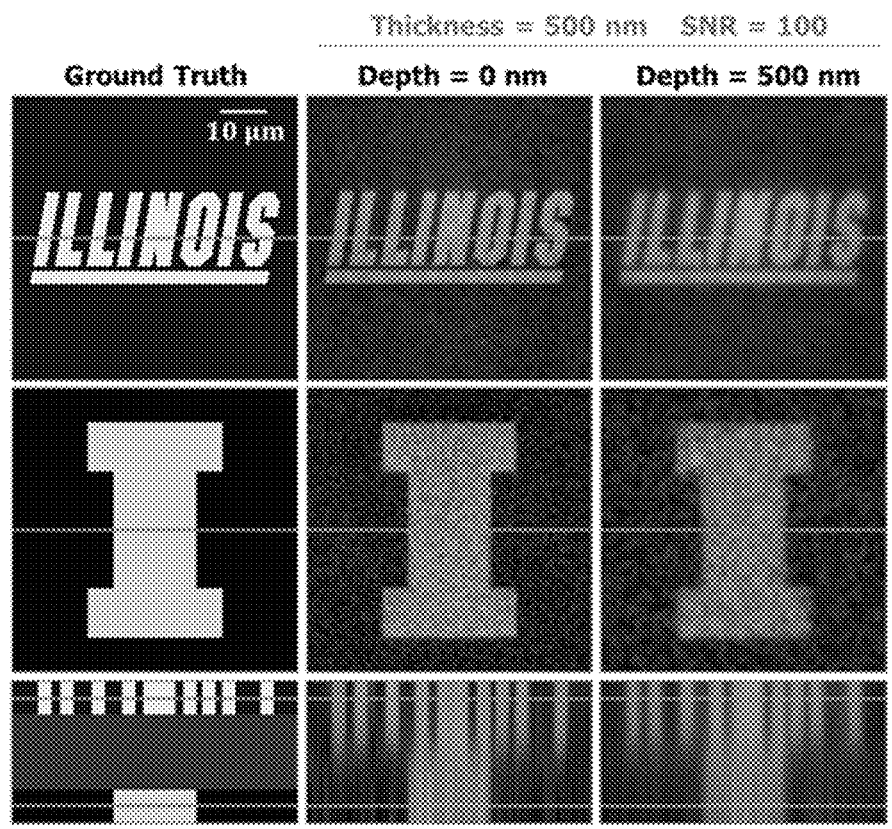
FIG. 10 depicts simulation results, according to an example embodiment.

The depth resolution is relatively invariant with respect to depth. This is advantageous since, in some embodiments, the material of interest is submerged in order to mitigate tip-enhancement effects in the AFM-IR forward response. Submerging material has little effect on the frequency response of the signal and thus does not significantly influence the depth resolution. However, the lateral resolution can be affected, primarily due to the apodization function. For reduced depth, the apodization function further reduces higher spatial frequencies to maintain a flat noise spectrum. This also reduces the lateral resolution. FIG. 10 shows the "Illinois" simulation for two submerged depths with thickness equal to 500 nm and estimate SNR equal to 100. The estimate SNR was set by adjusting the NRE equal to 1 and the measurement SNR equal to 100.

The bottom row of FIG. 10 shows constant depth resolution for both depth simulations. However, the top and middle rows show a loss of lateral resolution. The lateral resolution here was not quantified, but can be shown to depend on the apodization function, which is designed to attenuate high lateral spatial frequencies to maintain a flat noise spectrum. This attenuation increases with increasing depth thus reducing lateral resolution. The depth resolution, however, remains fixed because the depth information is recovered from the difference between different frequency measurements. This signal is thus relatively invariant to depth up to a certain extent.

Figure 11:
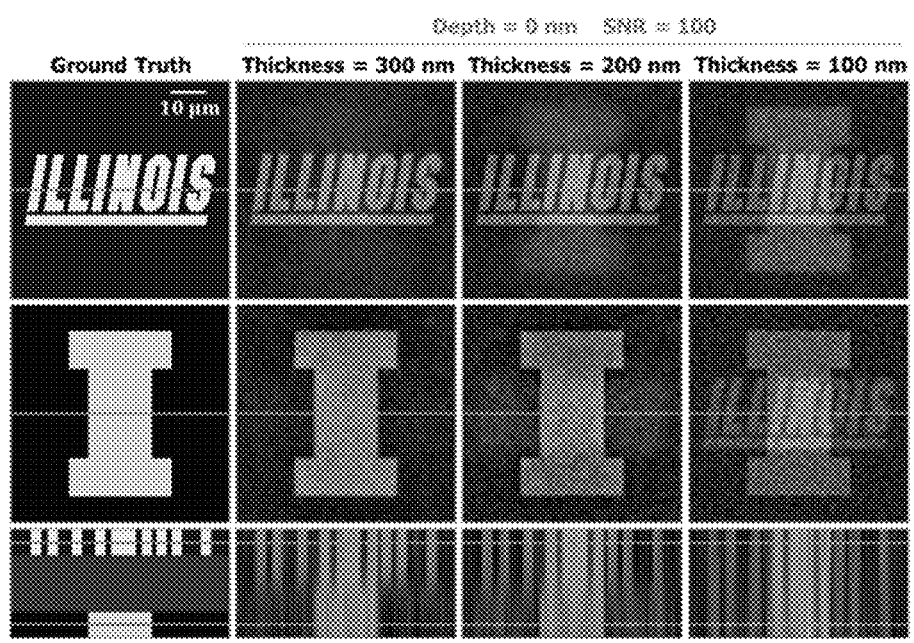
FIG. 11 depicts simulation results, according to an example embodiment.

Varying the thickness of the sample appears to improve the resolution in an approximately linear manner. This is, in part, because confining the depth-wise extent of the material of interest reduces the amount of information which needs to be recovered. This effect does not apply to arbitrarily thin samples. FIG. 11 shows the "Illinois" simulations for 3 thicknesses with depth and SNR equal to 0 nm and 100 respectively. Between 300 nm and 200 nm thickness, the depth resolution started to degrade, likely due to the transition to thin-sample behavior. For thin samples, material at different depths are indistinguishable and each plane produces substantially the same signal. The thin sample transition is approximately equal to the thermal diffusion length of the highest frequency, which is approximately equal to 250 nm in the example depicted in FIG. 11.

This thermal diffusion length $L_{TD}$ of the highest frequency measurement is defined as follows:

$$L_{TD} = \sqrt{\frac{\alpha}{f}} = \sqrt{\frac{1.41 * 10^{-7}}{2 * 10^6}} = 265 \text{ nm.} \quad (32)$$

For thicknesses below this length scale, the forward response is substantially invariant with respect to the frequency of the time-varying IR illumination from which depth information is derived. This lack of distinction between frequency measurements results in an inversion dominated by the regularization, producing a uniform resolution kernel which is equivalent to "perfect" depth mixing of signal across every estimate plane. This is consistent with the thin-sample theory and explains the error in the resolution estimate of FIG. 9. Indeed, any thickness between the thermal diffusion length of the lowest and highest frequency measurements will exhibit self-similar solutions which scale with thickness and result in resolution proportional to thickness. For this simulation, the depth resolution will always be about $\frac{1}{5}$ the total thickness due to the regularization parameter used. This can improve to $\frac{1}{10}$ based on the previous data for an error-free system. For larger thicknesses outside the specified thermal diffusion range, this self-similar behavior will break down, leading to an unknown resolution. This provides a restriction on the lowest and highest frequencies usable to reconstruct a given sample. For the given simulation noise, this would results in imaging within the 250 nm-1500 nm range with the frequencies used (i.e. 200 kHz-2 MHz). For lower error simulations, these limits can be improved. In this example, the SNR=100 level is approximately 250 nm beyond the point at which the difference between different-frequency frequency images becomes lower than the measurement error. Increasing the measurement SNR can improve this effect allowing for further resolution enhancement through reduced sample thickness.

Figure 12:
FIG. 12 depicts simulation results, according to an example embodiment.

The above simulations show resolution estimates with fixed SNR equal to 100. This estimated SNR was achieved with fixed NRE and an expansion measurement SNR equal to 1 and 100 respectively. Improving the measurement SNR allows for improving the NRE while maintaining constant estimate SNR. Additionally, improving the NRE allows for improving depth resolution. The implications of "perfect" SNR in estimating the resolution limits of AFM-IR are investigated in FIG. 12, which shows the "Illinois" simulation for errorless measurements. Depth resolution appears to improve with decreasing thickness without bound, suggesting AFM-IR could be used to distinguish absorbers which are arbitrarily close. Although this is possible provided sufficiently low-error measurements, the required SNR would eventually be higher than physically obtainable. An alternative way to achieve this resolution is to reduce the limiting thermal diffusion length scale by increasing the highest frequency while maintaining a specified level of SNR (e.g., 100). However, thermal diffusion length and frequency exhibit quadratic scaling. So, for example, to achieve 1 nm resolution with 5 nm thickness, the thermal diffusion length scale would be approximately 5 nm. This corresponds to frequencies equal to 5 GHz, which is well beyond the bandwidth of current AFM-IR hardware (i.e. cantilever, QCL, and sample thermal response). Thus, it would not be possible at present to achieve a measurement with SNR of 100 at this frequency. Additionally, the thermoelastic response would likely be inaccurate at this frequency, introducing significant bias error further reducing the SNR. Although arbitrarily small resolution is not possible, improving the expansion measurement SNR does allow for reducing the estimate resolution.

As noted above, the thermoelastic Green's function relating volumetric heating to surface displacement (or temperature, or some other heating-related measurable parameter of a sample of interest) can be determined and/or composed in a variety of ways. In some examples, the thermoelastic Green's function can be determined by modeling the sample of interest as an n-layer half space subject to arbitrary heating in one layer as shown in panel 'a' of FIG. 13. Because the solution is linear, heating in multiple layers can be added. Volumetric heat generation $Q(r_o)$ is defined as a function of $r_o=[x_o, y_o, z_o]$ which results in the vertical motion of the surface $\epsilon(x, s)$ where $x=[x, y]$ is the lateral position vector and s is the Laplace variable. The solution for arbitrary heating requires defining the thermoelastic Green's function $G_{u_z}$, which relates the vertical motion of the entire half-space in response to a kernel heat source (i.e. delta function) at depth $z_o$, as shown in panel 'b' of FIG. 13. The spatial form, however, does not have an explicit, analytical definition. Due to the film-like geometry, however, it is possible to convert to the spatial frequency domain, resulting in the schematic shown in panel 'c' of FIG. 13. An additional boundary condition was added to account for the energy added by the point heat source. This form can be solved analytically and used to define the Green's response as follows:

$$\tilde{\epsilon}(\omega, s) = 2\pi \int_\Omega \tilde{G}_e(|\omega|, z_o, s) \tilde{Q}(\omega, z_o) dz_o,$$

$$\tilde{G}_e(\rho, z_o, s) = -\tilde{G}_{u_z}(\rho, z, z_o, s)|_{z=0}. \tag{33}$$

The Green's function is an integral operator relating arbitrary 3D heating to vertical expansion of the sample surface. The governing equations for the vertical motion Green's function are defined as follows:

$$\mu_i \nabla^2 u_i + (\lambda_i + \mu_i) \nabla (\nabla \cdot u_i) = \gamma_i \nabla T_i, \tag{34}$$

$$\nabla^2 T_i - \frac{s}{\alpha_i} T_i = -\frac{1}{k_i} \delta(x, z_o)$$

where $\mu_i$ is the shear modulus, $\lambda_i$ is the lame's first parameter, $\rho_i$ is the density, $\alpha_i$ is the thermal diffusivity, and $k_i$ is the thermal conductivity of the ith layer. The parameter $\gamma_i$ is a grouped term which arises in thermoelasiticty equal to $(3\lambda_i + 2\mu_i)\beta_i$ where $\beta_i$ is the linear thermal expansion coefficient. The Green's function $G_{u_z}$ is equal to $u_i \cdot \hat{k}$ where $\hat{k}$ is the unit vector in the z-direction of FIG. 13. The solution for displacement is axisymmetric. As a result, the displacement can be decomposed as follows:

$$u_i = \nabla \phi_i + \nabla \times (\chi_i \hat{\theta}). \tag{35}$$

Here, $\phi_i$ and $\chi_i \hat{\theta}$ are the axisymmetric Helmholtz scalar and vector potential functions respectively. Applying this decomposition, the resulting governing equations can be defined as follows:

$$\nabla^2 \phi_i = m_i T_i, \tag{36}$$

$$\nabla^2 \chi_i = 0,$$

$$\nabla^2 T_i - \frac{s}{\alpha_i} T_i = -\frac{1}{k_i} \delta(x, z_o).$$

To solve, there are 4 stress conditions at each interface defined as follows:

$$u_i|_{z=d_i} = u_{i+1}|_{z=d_i},$$

$$\sigma_i \cdot \hat{n}|_{z=d_i} = \sigma_{i+1} \cdot \hat{n}|_{z=d_i}. \tag{37}$$

For the axisymmetric case in polar coordinates, these can be defined as follows:

$$B_i|_{z=d_i} = B_{i+1}|_{z=d_i}, \tag{38}$$

$$B_i = \begin{bmatrix} \mu_i \left( \frac{\partial}{\partial z}\left( \frac{\partial \phi_i}{\partial r} - \frac{\partial \chi_i}{\partial z}\right) + \frac{\partial^2}{\partial r \partial z}\left( \phi_i - \frac{\partial \chi_i}{\partial z}\right)\right) \\ -2\mu_i \left( \frac{1}{r}\frac{\partial}{\partial r}\left(r \frac{\partial \phi_i}{\partial r}\right) + \frac{\partial^2}{\partial z^2}\left(\frac{\partial \chi_i}{\partial z}\right)\right) \\ \frac{\partial \phi_i}{\partial r} - \frac{\partial \chi_i}{\partial z} \\ \frac{\partial}{\partial z}\left(\phi_i - \frac{\partial \chi_i}{\partial z}\right) \end{bmatrix}.$$

The potential functions are highly coupled through the boundary interactions which makes the problem difficult to solve. Moreover, the first condition complicates conversion into the frequency domain, further complicating the analysis. There exists another substitution which allows for decoupling this system. To determine this substitution, consider the Fourier transform of the second condition of equation (38) and the vector potential equation (36) defined as follows:

$$-2\mu_i \left( -\rho^2 \tilde{\phi}_i + \frac{\partial^3 \tilde{\chi}_i}{\partial z^3} \right) \tag{39}$$

$$\frac{\partial^2 \tilde{\chi}_i}{\partial z^2} = \rho^2 \tilde{\chi}_i$$

These results can be combined to simplify the 2$^{nd}$ interface condition as follows:

$$2\mu_i \rho^2 \left( \tilde{\phi}_i - \frac{\partial \tilde{\chi}_i}{\partial z} \right). \tag{40}$$

In the frequency domain, the second interface condition relates terms of the form $$\tilde{\phi}_i - \frac{\partial \tilde{\chi}_i}{\partial z}$$

scaled by a constant $\rho^2$. To develop the interface conditions in the frequency domain, the constant $\rho^2$ can be omitted, which is equivalent to rewriting the interface conditions as follows:

$$B_i |_{z=d_i} = B_{i+1} |_{z=d_i}, \quad (41)$$

$$B_i = \begin{bmatrix} \mu_i\left(\frac{\partial}{\partial z}\left(\frac{\partial \phi_i}{\partial r} - \frac{\partial \chi_i}{\partial z}\right) + \frac{\partial^2}{\partial r \partial z}\left(\phi_i - \frac{\partial \chi_i}{\partial z}\right)\right) \\ \mu_i\left(\phi_i - \frac{\partial \chi_i}{\partial z}\right) \\ \frac{\partial \phi_i}{\partial r} - \frac{\partial \chi_i}{\partial z} \\ \frac{\partial}{\partial z}\left(\phi_i - \frac{\partial \chi_i}{\partial z}\right) \end{bmatrix}.$$

From this result, a new substitution can be defined as follows:

$$\Phi_i = \phi_i - \frac{\partial \chi_i}{\partial z} \quad (42)$$

$$X_i = \frac{\partial \phi_i}{\partial r} - \frac{\partial \chi_i}{\partial z}.$$

These new potential functions are harmonic. Additionally, $\Phi_i$ is equal $$\frac{\partial u_z}{\partial z}$$

providing a direct solution for vertical motion. Thus, solving for potential $\Phi_i$ facilitates the determination of a solution for the vertical motion Green's function. Applying the new potential definitions to equations (41) and (36) results in the following:

$$\nabla^2 \Phi_i = m_i T_i, \quad (43)$$

$$\mu_i \Phi_i |_{z=d_i} = \mu_{i+1} \Phi_{i+1} |_{z=d_i},$$

$$\frac{\partial \Phi}{\partial z} |_{z=d_i} \frac{\partial \Phi_{i+1}}{\partial z} |_{z=d_i}.$$

In the absence of body forces, the potential $\Phi_i$ is a function of temperature, which is governed by the following:

$$\nabla^2 T_i - \frac{s}{\alpha_i} T_i = \frac{1}{k_i} \delta(x, z_o) \quad (44)$$

$$T_i |_{z=d_i} = T_i |_{z=d_i}$$

$$k_i \frac{\partial T_i}{\partial z} |_{z=d_i} = k_{i+1} \frac{\partial T_i}{\partial z} |_{z=d_i}.$$

Thus, equations (43) and (44) provide a complete system for determining the vertical sample motion in response to heat generation. One solution is to solve for the temperature and the kernel response for $\Phi_i$ and apply a convolution. However, the final convolution resulting from such an approach analytically difficult to resolve. As an alternative, the two $2^{nd}$ order systems can be combined into one $4^{th}$ order as follows:

$$\nabla^2 \nabla^2 \Phi_i - \frac{s}{\alpha_i} \nabla^2 \Phi_i = -\frac{m_i}{k_i} \delta(x, z_o) \quad (45)$$

$$\mu_i \Phi_i |_{z=d_i} = \mu_{i+1} \Phi_{i+1} |_{z=d_i}$$

$$\frac{\partial \Phi_i}{\partial z} |_{z=d_i} = \frac{\partial \Phi_{i+1}}{\partial z} |_{z=d_i}$$

$$\frac{1}{m_i} \nabla^2 \Phi_i |_{z=d_i} = \frac{1}{m_{i+1}} \nabla^2 \Phi_{i+1} |_{z=d_i}$$

$$\frac{k_i}{m_i} \frac{\partial \nabla^2 \Phi_i}{\partial z} |_{z=d_i} = \frac{k_{i+1}}{m_{i+1}} \frac{\partial \nabla^2 \Phi_{i+1}}{\partial z} |_{z=d_i}$$

This system describes the governing behavior for $\Phi_i$ inside each film as well as 4 conditions of $\Phi_i$ at each interface. There are 4 more conditions at z equal to zero and infinity defined as follows:

$$\Phi_1 |_{z=0} = 0. \quad \lim_{z \to \infty} \frac{\partial \Phi_n}{\partial z} = 0, \quad (46)$$

$$\frac{\partial \nabla^2 \Phi_i}{\partial z} |_{z=0} = 0. \quad \lim_{z \to \infty} \nabla^2 \Phi_n = 0.$$

These conditions yield a stress-free, insulating surface with zero motion and temperature at infinite depth resulting in a well-defined system for all potentials $\Phi_i$. The Green's function for vertical motion is simply the z derivative of $\Phi_i$. Temperature can easily be solved directly from the solution of $\Phi_i$ using equation (43). Radial sample motion can be determined using $\Phi_i$, temperature, and the remaining, unused interface conditions.

The vertical displacement Green's solution can be determined by applying a Fourier transform resulting in the following:

$$\frac{\partial^4 \Phi_i}{\partial z^4} - \left(2\rho^2 + \frac{s}{\alpha_i}\right)\frac{\partial^2 \Phi_i}{\partial z^2} + \left(\rho^4 + \frac{s}{\alpha_i}\rho^2\right)\Phi_i = -\frac{m_i}{2\pi k_i}\delta(z_o). \quad (47)$$

The delta function at plane $z_o$ can be treated as another interface by changing the interface conditions to the following:

$$B_i |_{z=d_i} = B_{i+1} |_{z=d_i} + \frac{1}{2\pi} \delta_{ij} D \quad (48)$$

$$B_i = \begin{bmatrix} \mu_i \Phi_i \\ \frac{\partial \Phi_i}{\partial z} \\ \frac{1}{m_i}\left(\frac{\partial^2 \Phi_i}{\partial z^2} - \rho^2 \Phi_i\right) \\ \frac{k_i}{m_i}\left(\frac{\partial^3 \Phi_i}{\partial z^3} - \rho^2 \frac{\partial \Phi_i}{\partial z}\right) \end{bmatrix} \quad D = \begin{bmatrix} 0 \\ 0 \\ 0 \\ 1 \end{bmatrix}.$$

Here, a constant of $$\frac{1}{2\pi}$$

is applied to the $4^{th}$ interface condition (heat flux) for the jth interface which is located at $z_o$ to account for the delta heat source. Provided an extra interface, equation (47) for each layer becomes homogeneous resulting in the following:

$$\frac{\partial^4 \tilde{\Phi}_i}{\partial z^4} - \left(2\rho^2 + \frac{s}{\alpha_i}\right)\frac{\partial^2 \tilde{\Phi}_i}{\partial z^2} + \left(\rho^4 + \frac{s}{\alpha_i}\rho^2\right)\tilde{\Phi}_i = 0. \quad (49)$$

The general solution for each layer is defined as follows:

$$\tilde{\Phi}_i = c_{4i-3}e^{\sqrt{\rho^2 + \frac{s}{\alpha_i}}\,z} + c_{4i-2}e^{-\sqrt{\rho^2 + \frac{s}{\alpha_i}}\,z} + c_{4i-1}e^{\rho z} + c_{4i}e^{-\rho z}. \quad (50)$$

Figure 13:
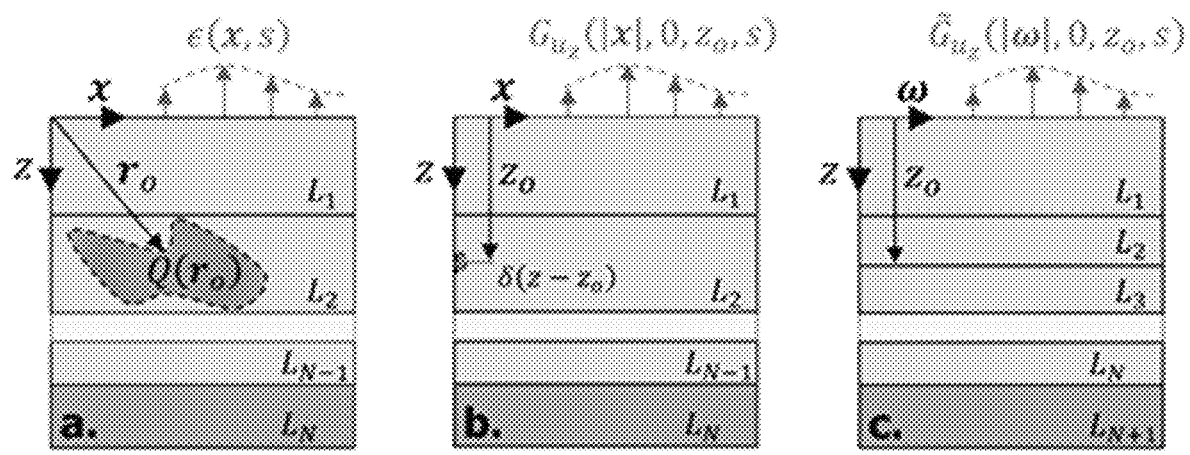
FIG. 13, illustrates in cross-section, elements of a multilayer thermoelastic model of a sample, according to an example embodiment.

This results in 4(n+1) unknown coefficients for the layers of panel 'c' of FIG. 13. The interface conditions of equation (48) provide 4n equations. The remaining 4 equations come from the z equal to zero and infinite planes defined as follows:

$$\tilde{\Phi}_1|_{z=0} = 0 \quad \lim_{z\to\infty}\frac{\partial \tilde{\Phi}_n}{\partial z} = 0 \quad (51)$$

$$\left(\frac{\partial^3 \tilde{\Phi}_1}{\partial z^3} - \rho^2\frac{\partial \tilde{\Phi}_1}{\partial z}\right)|_{z=0} = 0 \quad \lim_{z\to\infty}\left(\frac{\partial^2 \tilde{\Phi}_n}{\partial z^2} - \rho^2\tilde{\Phi}_n\right) = 0.$$

Equation (50) can be applied to equations (48) and (51) forming a complete system of equations to determine the unknown coefficients of $\tilde{\Phi}_i$. The vertical displacement Green's function is defined as follows:

$$\tilde{G}_{u_z}(\rho, z, z_o, s) = \sum_{i=1}^{N+1} \frac{\partial \tilde{\Phi}_i(\rho, z, z_o, s)}{\partial z}(H(z - d_{i-1}) - H(z - d_i)). \quad (52)$$

Here, the function H is the Heaviside step function. The Green's function solution can be computed programmatically using the nd_zdisp_kernel() function provided in the appendix.

One special case for the Green's function is a half space with constant properties. This definition admits a simple, closed-form solution for the surface expansion Green's function defined as follows:

$$\tilde{G}_{u_z}(\rho, 0, z_o, s) = \frac{\alpha m}{2\pi ks}\left(e^{-\rho z_o} - \rho\frac{e^{-\sqrt{\rho^2 + \frac{s}{a}}\,z_o}}{\sqrt{\rho^2 + \frac{s}{a}}}\right). \quad (53)$$

This provides an illustration of the frequency dependent nature of the surface expansion to arbitrary heating without the complexity of internal material interfaces. For heterodyne detection, the volume of heated material that contributes to the local surface expansion is proportional to the square root of the frequency. This is the thermal diffusion length defined for heterodyne detection methods. The heterodyne signal (assuming the system response is fast) is equal to the quasi steady harmonic expansion defined as follows:

$$G_{u_z}(\rho, 0, z_o, s)|_{s=i2\pi f}. \quad (54)$$

Here, the Green's function is simply evaluated at $s=i2\pi f$. Transient solutions employ the entire range of temporal frequencies to assess the exact behavior. This dimensionality reduction is one advantage to heterodyne detection. Indeed, time-domain solutions have a number of other issues which can be demonstrated using the properties of the Laplace domain solution. Applying the final value theorem:

$$\lim_{s\to 0} s\tilde{G}_{u_z}(\rho, 0, z_o, s) = \begin{cases} -\frac{\alpha m}{2\pi k} & \rho = 0 \\ 0 & \text{else} \end{cases}. \quad (55)$$

Accordingly, in infinite time, all high spatial frequencies will approach a value of zero; however, the DC signal will be proportional to the average energy applied to the half space. For any non-zero energy applied to the half space, the final surface will be displaced from its zero position and never come back according to this result which is obviously not physically possible and would imply that all objects that absorb heat expand forever. This result occurs due to the assumption of the insulating surface and the fact that all heating contains a DC spatial frequency component. The energy of a planar (DC) heat source can diffuse in the vertical direction, but never escape the half space due to the insulating surface. Because the DC vertical expansion is the integral of temperature in the entire half space, the DC expansion equals the total energy which can never dissipate through the surface. This assumption is valid for high temporal frequencies but fails in the low temporal frequency regime below about 1 Hz where convective heat transfer from the surface dominates. Although Green's function developed above doesn't incorporate this effect, convective boundary conditions would still result in a relaxation time on the order of seconds which is extremely slow. For detection systems such as AFMs which use the low-speed deflection signal to track sample height and high-speed deflection to record IR signals, this slow thermal relaxation can produce coupling between these two channels. Heterodyne detection techniques which record the quasi-steady harmonic expansion of the sample do not exhibit this real time interaction between low- and high-speed deflection signals. The only transient response which is relevant to detection in that mode is that of the cantilever which can be as fast as 10 us for even standard contact mode probes.

The half-space surface expansion Green's function has a closed-form solution in spatial domain in terms of standard mathematical functions as follows:

$$G_{u_z}(r, 0, z_o, s) = -\frac{\alpha m}{2\pi ks}\left(\frac{z}{(r^2 + z^2)^{\frac{3}{2}}} + \frac{1}{r}\frac{\partial}{\partial r}\left(r\frac{\partial G_o}{\partial r}\right)\right), \quad (56)$$

$$G_o = I_o\left(\frac{1}{2}\sqrt{\frac{s}{\alpha}}\left(\sqrt{r^2 + z^2} - z\right)\right)K_o\left(\frac{1}{2}\sqrt{\frac{s}{\alpha}}\left(\sqrt{r^2 + z^2} - z\right)\right)$$

The functions $I_o$ and $K_o$ are modified Bessel functions. In addition, the Green's function is a generalization of the multi-film model. The multi-film solution is equal to the following:

$$u_z(z, s) = -2\pi \Sigma_i Q_i \int_{t_i} \tilde{G}_{u_z}(0, z, z_o, s)dz_o. \quad (57)$$

For uniform heat in films (e.g., the multi-film layered model depicted herein), the z displacement is equal to the integral of the Green's function over each film thickness $t_i$, times the heating in the film $Q_i$, summed over all films and then times $-2\pi$ due to the Fourier transform definition used.

The Green's function is an integral operation in the z-dimension and convolution in the lateral dimensions. The convolution can be computed efficiently using discrete Fourier transforms then integrated in z to simulate the expansion forward model using sampled heating functions.

Although the exact expansion is a continuous function, data processing is applied to uniformly sampled data sets measuring the expansion. The expansion response of the surface has the following spatial definition:

$$\epsilon(x, s) = \int_\Omega \int_{\mathbb{R}^2} G_\epsilon(|x-x_o|, z_o, s) Q(x_o, z_o) dx_0 \, dz_o. \quad (58)$$

Here, x is the output lateral position vector, $x_o$ and $z_o$ are the lateral and depth positions of heat sources Q and $\Omega$ is the domain of the heated film. An equivalent form can be defined as follows:

$$\epsilon(x, s) = \int_{106} \int_{\mathbb{R}^2} \tilde{G}_\epsilon(|\omega|, z_o, s) \tilde{Q}(\omega, z_o) e^{i(x\cdot\omega)} d\omega dz_o. \quad (59)$$

Here, the convolution is represented in spatial frequency form. Uniformly sampled expansion can be defined as follows:

$$\epsilon(n, s) = \int_\Omega \int_{\mathbb{R}^2} \tilde{G}_{68}(|\omega|, z_o, s) \tilde{Q}(\omega, z_o) e^{i((n\odot\Delta x)\cdot\omega)} d\omega dz_o. \quad (60)$$

Here, the increment vector $\Delta x$ represents the spacing of the sampled position vector x where n is a finite set of integers for both dimensions. The operator $\odot$ represents the element-wise multiplication. Applying a discrete Fourier transform results in the following:

$$\tilde{\epsilon}(k, s) =$$

$$\int_\Omega \int_{k^2} G_\epsilon(|\omega|, z_o, s) \tilde{Q}(\omega, z_o) \Sigma_n e^{in\cdot(\Delta x \odot \omega - 2\pi k \odot K)} d\omega dz_o \quad (61)$$

Here, the vector K is the inverse of the number of samples in each dimension. The spatial frequencies integral can be discretized with sampling:

$$\Delta\omega_x = \frac{2\pi}{\Delta x N}, \Delta\omega_y = \frac{2\pi}{\Delta y M}. \quad (62)$$

This results in the following:

$$\tilde{\epsilon}(k, s) = \int_\Omega \Sigma_u \tilde{G}_\epsilon(\|u\odot\Delta\omega\|, z_o, s)\tilde{Q}(u\odot\Delta\omega, z_o) f_{uk} \Delta\omega_y \Delta\omega_x dz_o$$

$$f_{uk} = \Sigma_n e^{i2\pi(n\odot K)\cdot(u-k)} \quad (63)$$

The function $f_{uk}$ is a multidimensional Kronecker delta function. Thus, u can be eliminated, resulting in the following:

$$\tilde{\epsilon}(k, s) = 2\pi \int_\Omega \tilde{G}_\epsilon(\|k\odot\Delta\omega\|, z_o, s)\left(\tilde{Q}(k\odot\Delta\omega, z_o)\frac{\sqrt{2\pi}}{\Delta x}\frac{\sqrt{2\pi}}{\Delta y}\right)dz_o. \quad (64)$$

By the definition of both continuous and discrete Fourier transforms used in this analysis, it can be shown that the heating function scaled by $$\frac{\sqrt{2\pi}}{\Delta x}\frac{\sqrt{2\pi}}{\Delta y}$$

as shown here is simply the discrete Fourier transform of the uniformly sampled heat generation function in spatial coordinates. Applying this definition, the expansion signal can be written as follows:

$$\tilde{\epsilon}(k, s) = 2\pi \int_\Omega \tilde{G}_\epsilon(\|k\odot\Delta\omega\|, z_o, s)\tilde{Q}(k, z_o)dz_o. \quad (65)$$

Here, the new definition of $\tilde{Q}$ is simply the discrete Fourier transform of the heating function sampled uniformly in spatial domain. Because the Green's function $\tilde{G}_{u_z}$ was derived with a coordinate system z dimension on the inward facing normal of the surface, this can be rewritten as:

$$\tilde{\epsilon}(k, s) = -2\pi \int_\Omega \tilde{G}_{u_z}(\|k\odot\Delta\omega\|, z_o, s)\tilde{Q}(k, z_o)dz_o. \quad (66)$$

To simulate z sampled heating, the z integral can be discretized using basic quadrature rules as follows:

$$\tilde{\epsilon}(k, s) = -2\pi\Delta z \Sigma_{i=0}^{L-1}[\tilde{G}_{u_z}(\|k\odot\Delta\omega\|, l\Delta z + d_j, s)\tilde{Q}(k, l\Delta z + d_j)] \quad (67)$$

Here, a rectangle integration rule has been applied to a signal layer for depth z from $d_j$ to $(L-1)\Delta z + d_j$. Performing this for multiple layers and computing the sum of the results allows for arbitrary heating spanning multiple layers. A general quadrature rule can be incorporated by applying appropriate weights to each layer's contribution. Expansion can be simulated by applying a 2D DFT to the heating function sampled uniformly in the discrete spatial domain then multiplied by the Green's function sampled at spatial frequencies $\|k\odot\Delta\omega\|$, depth $l\Delta z + d_j$ and frequency $s = i2\pi f$ where f is the temporal frequency. Applying inverse DFT allows for recovering spatial form.

The methods and systems described herein can also be adapted to mapping the pattern of heat generation and/or dissipation within an electronic device (e.g., a monolithic integrated circuit or other integrated circuit component that may include nano-scale electronic structures or components). This can be advantageous, e.g., in order to map the pattern of heat generation and/or dissipation in an electronic integrated circuit in order to analyze or improve the thermal characteristics of the integrated circuit, to design heat management apparatus for the circuit (e.g., to determine a size, geometry, and composition of a heat sink, heat spreader, or other heat management component(s)), to reverse engineer the component, to assess the fabrication methods employed to create the integrated circuit, or to perform some other analysis or imaging of the pattern of generation of heat within the component. Adapting the methods and systems described herein in this manner could include, instead of applying infrared heating from without, causing the component being imaged to operate or otherwise to generate heat in a time-varying manner. The frequency of the operation (e.g., of a clock generated and/or applied to the component, of a pattern of operability and inoperability) of the component could be set to a variety of different frequencies while detecting the magnitude and phase of the variation in displacement of the surface of the component at the corresponding frequencies.

To provide an enhanced measurement signal (e.g., sample surface displacement as measured by an AFM probe), an electronic device under investigation could have applied thereto a polymer layer or other coating that expands when heated by the electronic device. Determining the thermoelastic Green's function for such a sample could include inserting a bead or other artifact of known geometry and thermoelastic properties into the applied polymer layer. Photo-induced heating of the sample could then be investigated as described elsewhere herein (e.g., by applying time-varying patterns of infrared illumination to the sample) in order to empirically determine the thermoelastic Green's function for the sample.

II. Example Systems

Figure 14:
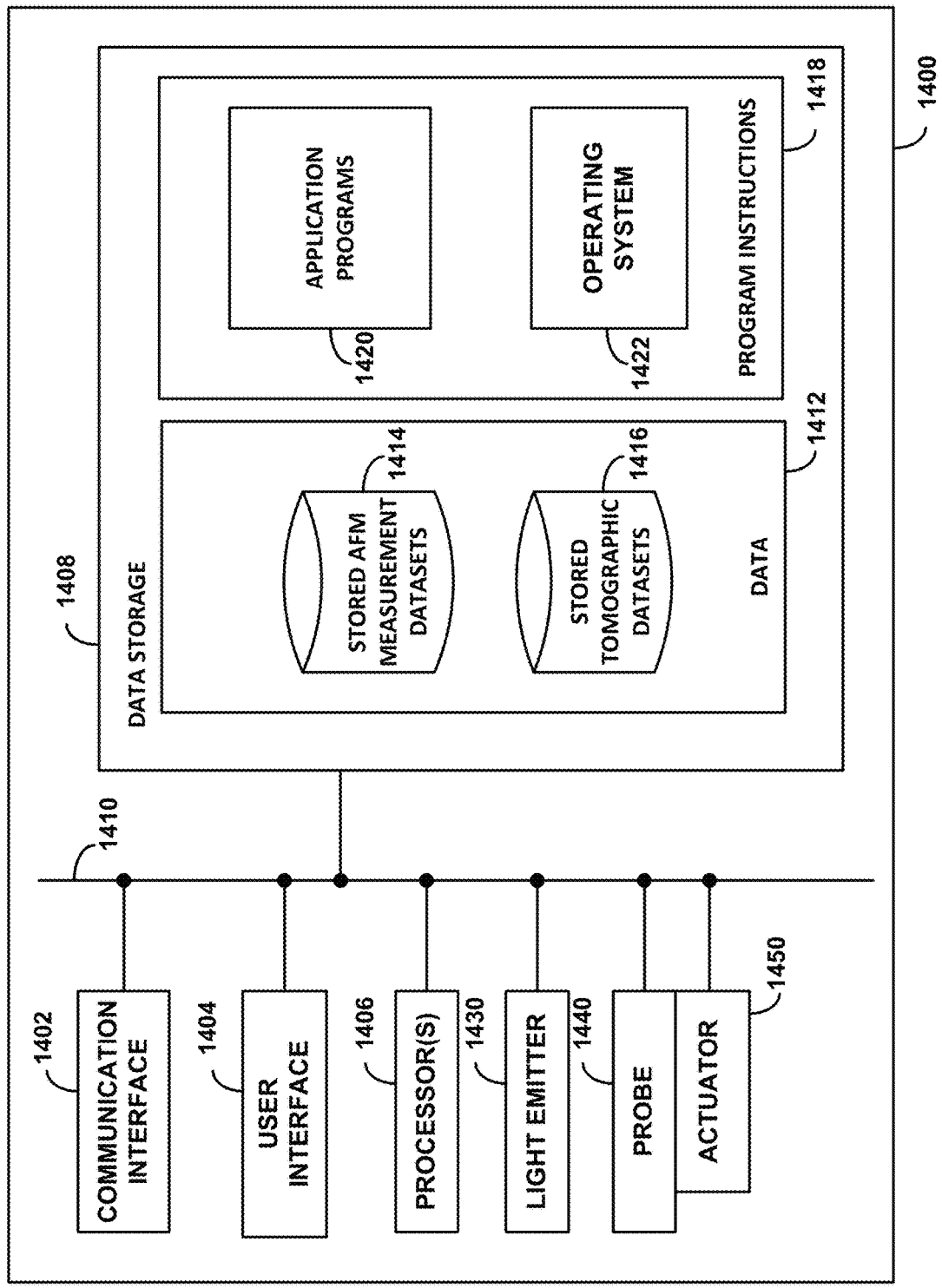
FIG. 14 illustrated elements of a system, according to an example embodiment.

FIG. 14 illustrates an example system 1400 that may be used to implement the methods described herein. By way of example and without limitation, system 1400 may be or include an atomic force microscopy instrument, a computer (such as a desktop, notebook, tablet, or handheld computer, a server), elements of a cloud computing system, or some other type of device. It should be understood that elements of system 1400 may represent a physical instrument and/or computing device such as an atomic force microscope, a server, a particular physical hardware platform on which applications operate in software, or other combinations of hardware and software that are configured to carry out functions as described herein.

As shown in FIG. 14, system 1400 may include a communication interface 1402, a user interface 1404, one or more processor(s) 1406, a light emitter 1430, a probe 1440, and actuator 1450, and data storage 1408, all of which may be communicatively linked together by a system bus, network, or other connection mechanism 1410.

Communication interface 1402 may function to allow system 1400 to communicate, using analog or digital modulation of electric, magnetic, electromagnetic, optical, or other signals, with other devices (e.g., with additional or alternative atomic force microscope instruments), access networks, and/or transport networks. Thus, communication interface 1402 may facilitate circuit-switched and/or packet-switched communication, such as plain old telephone service (POTS) communication and/or Internet protocol (IP) or other packetized communication. For instance, communication interface 1402 may include a chipset and antenna arranged for wireless communication with a radio access network or an access point. Also, communication interface 1402 may take the form of or include a wireline interface, such as an Ethernet, Universal Serial Bus (USB), or High-Definition Multimedia Interface (HDMI) port. Communication interface 1402 may also take the form of or include a wireless interface, such as a Wifi, BLUETOOTH®, global positioning system (GPS), or wide-area wireless interface (e.g., WiMAX, 3GPP Long-Term Evolution (LTE), or 3GPP 5G). However, other forms of physical layer interfaces and other types of standard or proprietary communication protocols may be used over communication interface 1402. Furthermore, communication interface 1402 may comprise multiple physical communication interfaces (e.g., a Wifi interface, a BLUETOOTH® interface, and a wide-area wireless interface).

In some embodiments, communication interface 1402 may function to allow system 1400 to communicate, with other devices, remote servers, access networks, and/or transport networks. For example, the communication interface 1402 may function to communicate with one or more servers (e.g., servers of a cloud computer system that provide computational resources for a fee) to provide AFM measurement data and to receive, in response, computed tomographic datasets representing the three-dimensional pattern of infrared absorptivity within a sample from which the AFM measurement data was sampled. In another example, the communication interface 1402 may function to communicate with one or more AFM instruments to receive such AFM measurement data therefrom and/or to command or operate such AFM instruments to generate such AFM measurement data.

User interface 1404 may function to allow system 1400 to interact with a user, for example to receive input from and/or to provide output to the user. Thus, user interface 1404 may include input components such as a keypad, keyboard, touch-sensitive or presence-sensitive panel, computer mouse, trackball, joystick, microphone, and so on. User interface 1404 may also include one or more output components such as a display screen which, for example, may be combined with a presence-sensitive panel. The display screen may be based on CRT, LCD, and/or LED technologies, or other technologies now known or later developed. User interface 1404 may also be configured to generate audible output(s), via a speaker, speaker jack, audio output port, audio output device, earphones, and/or other similar devices.

Light emitter 1430 may include one or more tunable free electron lasers, pulsed optical parametric oscillators, quantum cascade lasers, or other variety of light emitter configured to generate tunable-wavelength infrared illumination that can be emitted in a time-varying manner at a variety of different frequencies to facilitate the methods described herein. The light emitter 1430 could include an actuator (e.g., galvanometer-driver mirror(s)) to facilitate tracking the probe 1440 as it moves, relative to the light emitter 1430, to various different locations across the surface of a sample. Additionally or alternatively, the light emitter 1430 could include actuated mirrors, spatial light modulators, or other elements configured to facilitate the controlled variation over time of the magnitude of the illumination emitted to a sample (e.g., to comport the magnitude of the emitted illumination to a specified time-varying frequency).

Probe 1440 could include AFM cantilevers, optical interrogators thereof, laser interferometers, or other elements configured to detect the time-varying displacement of the surface of a sample or to detect some other relevant time-varying parameter of a sample under test that varies in time with an applied time-varying infrared illumination in a manner that is related to the three-dimensional pattern of heating and thermal diffusion within the sample due to illumination and/or heat dissipation by circuitry within the sample. Such alternative measured sample parameters could include sample displacement, temperature, surface temperature, bulk sample temperature, etc. The probe 1440 could include a silicon AFM cantilever with a probe tip that lacks a gold coating or that is otherwise configured to reduce tip enhancement of applied illumination. For example, the tip of such an AFM probe could exhibit a magnitude of electric field enhancement M (defined as defined as $|M|^2=|E_{loc}/E_{in}|$, where $E_{loc}$ and $E_{in}$ are local and incident electric field, respectively) at a location 0.5 nm below the tip that is less than 200, or that is less than 100.

Actuator 1450 could include piezo actuators, motors, solenoids, lead screws, or other elements sufficient to control the location of the probe 1440 (e.g., an AFM probe tip of the probe, a location of an interferometric laser probe beam) relative to a sample under test such that the time-varying displacement of a surface thereof in response to time-varying infrared illumination can be measured at a plurality of different locations across the surface of the sample. Such an actuator 1450 could be coupled to the probe 1440 so as to control the location of the probe and/or to the sample under test so as to control the location of the sample. The actuator 1450 could be operated in a feedback mode so as to provide an improved signal-to-noise ratio of such displacement measurements, e.g., as described in U.S. Pat. No. 11,143,672, "Method and Apparatus for Correcting Responsivity Variation in Photothermal Imaging."

Processor(s) 1406 may comprise one or more general purpose processors—e.g., microprocessors—and/or one or more special purpose processors—e.g., digital signal processors (DSPs), graphics processing units (GPUs), floating point units (FPUs), network processors, tensor processing units (TPUs), or application-specific integrated circuits (ASICs). In some instances, special purpose processors may be capable of image processing, executing optimization algorithms to computationally and/or analytically solve inverse problems as described herein, among other applications or functions. Data storage 1408 may include one or more volatile and/or non-volatile storage components, such as magnetic, optical, flash, or organic storage, and may be integrated in whole or in part with processor(s) 1406. Data storage 1408 may include removable and/or non-removable components.

Processor(s) 1406 may be capable of executing program instructions 1418 (e.g., compiled or non-compiled program logic and/or machine code) stored in data storage 1408 to carry out the various functions described herein. Therefore, data storage 1408 may include a non-transitory computer-readable medium, having stored thereon program instructions that, upon execution by system 1400, cause system 1400 to carry out any of the methods, processes, or functions disclosed in this specification and/or the accompanying drawings. The execution of program instructions 1418 by processor(s) 1406 may result in processor 1406 using data 1412.

By way of example, program instructions 1418 may include an operating system 1422 (e.g., an operating system kernel, device driver(s), and/or other modules) and one or more application programs 1420 (e.g., functions for executing the methods described herein, function for operating the light emitter 1430, probe 1440, and actuator 1450 to interrogate a sample as described herein) installed on system 1400. Data 1412 may include stored AFM measurement datasets 1414 generated by operating the light emitter 1430, probe 1440, and actuator 1450 and/or received from another system and/or stored tomographic datasets 1416 generated by applying the methods described herein to such AFM measurement datasets.

Application programs 1420 may communicate with operating system 1422 through one or more application programming interfaces (APIs). These APIs may facilitate, for instance, application programs 1420 reading and/or writing a thermoelastic Green's function determined and/or simulated for a sample, transmitting or receiving information via communication interface 1402, receiving and/or displaying information on user interface 1404, operating the light emitter 1430, probe 1440, and actuator 1450 to generate an AFM measurement dataset for a sample, and so on.

Application programs 1420 may take the form of "apps" that could be downloadable to system 1400 through one or more online application stores or application markets (via, e.g., the communication interface 1402). However, application programs can also be installed on system 1400 in other ways, such as via a web browser or through a physical interface (e.g., a USB port) of the system 1400.

III. Example Methods

Figure 15:
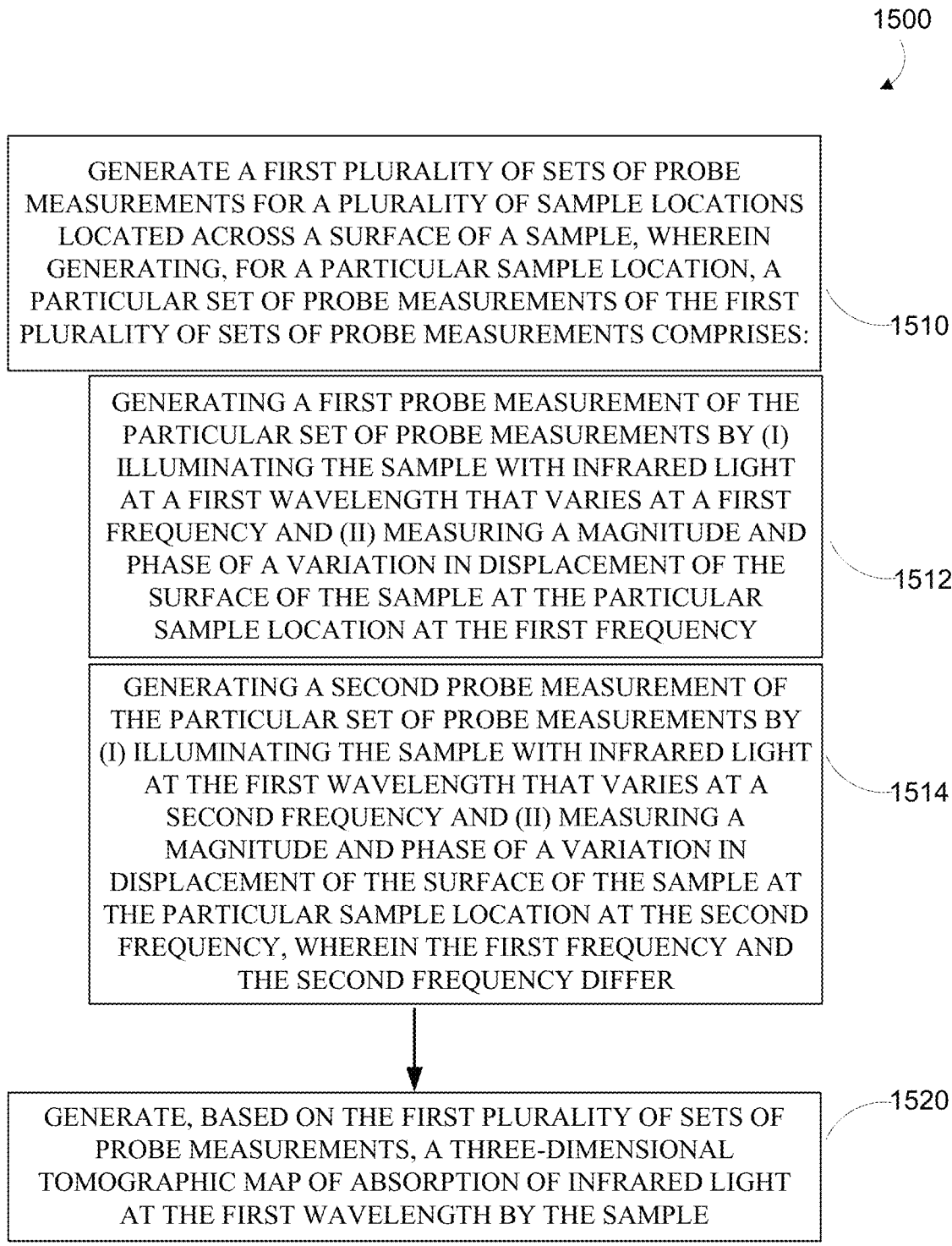
FIG. 15 is a flowchart of a method, according to an example embodiment.

FIG. 15 is a flowchart of a method 1500 for nanoscale tomographic infrared absorption imaging. The method 1500 includes generating a first plurality of sets of probe measurements for a plurality of sample locations located across a surface of a sample (1510). Generating, for a particular sample location, a particular set of probe measurements of the first plurality of sets of probe measurements comprises: generating a first probe measurement of the particular set of probe measurements by (i) illuminating the sample with infrared light at a first wavelength that varies at a first frequency and (ii) measuring a magnitude and phase of a variation in displacement of the surface of the sample at the particular sample location at the first frequency (1512); and generating a second probe measurement of the particular set of probe measurements by (i) illuminating the sample with infrared light at the first wavelength that varies at a second frequency and (ii) measuring a magnitude and phase of a variation in displacement of the surface of the sample at the particular sample location at the second frequency, wherein the first frequency and the second frequency differ (1514). The method 1500 also includes generating, based on the first plurality of sets of probe measurements, a three-dimensional tomographic map of absorption of infrared light at the first wavelength by the sample (1520). The method 1500 could include additional elements or features.

Figure 16:
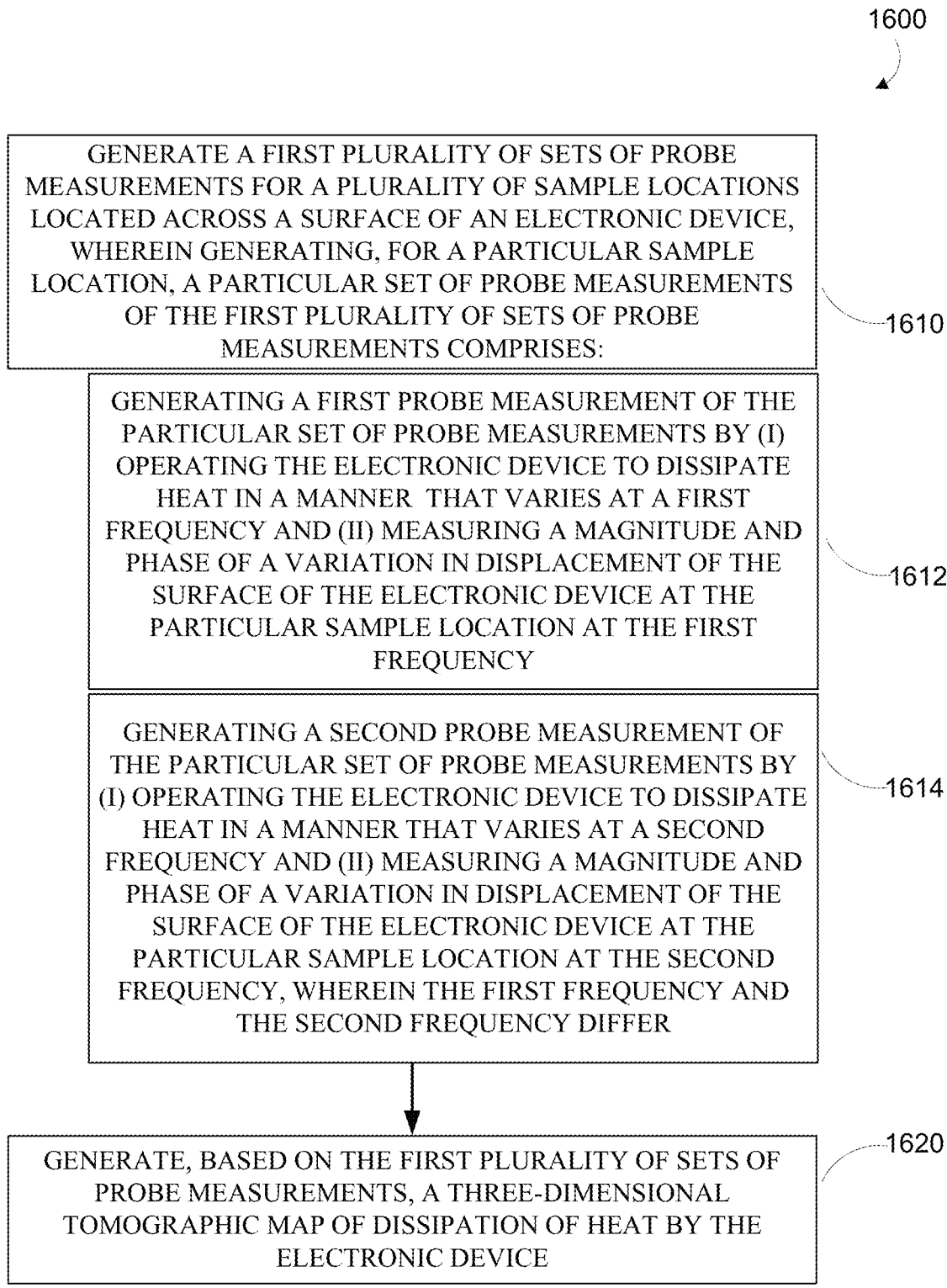
FIG. 16 is a flowchart of a method, according to an example embodiment.

FIG. 16 is a flowchart of a method 1600 for nanoscale tomographic imaging of heat dissipation in electronic devices. The method 1600 includes generating a first plurality of sets of probe measurements for a plurality of sample locations located across a surface of an electronic device (1610). Generating, for a particular sample location, a particular set of probe measurements of the first plurality of sets of probe measurements comprises: generating a first probe measurement of the particular set of probe measurements by (i) operating the electronic device to dissipate heat in a manner that varies at a first frequency and (ii) measuring a magnitude and phase of a variation in displacement of the surface of the electronic device at the particular sample location at the first frequency (1612); and generating a second probe measurement of the particular set of probe measurements by (i) operating the electronic device to dissipate heat in a manner that varies at a second frequency and (ii) measuring a magnitude and phase of a variation in displacement of the surface of the electronic device at the particular sample location at the second frequency, wherein the first frequency and the second frequency differ (1614). The method 1600 also includes generating, based on the first plurality of sets of probe measurements, a three-dimensional tomographic map of dissipation of heat by the electronic device (1620). The method 1600 could include additional elements or features.

IV. Conclusion

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flowcharts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A method for nanoscale tomographic infrared absorption imaging, the method comprising:
    generating a first plurality of sets of probe measurements for a plurality of sample locations located across a surface of a sample, wherein generating, for a particular sample location, a particular set of probe measurements of the first plurality of sets of probe measurements comprises:
        generating a first probe measurement of the particular set of probe measurements by illuminating the sample with infrared light at a first wavelength that varies at a first frequency and measuring a magnitude and phase of a variation in displacement of the surface of the sample over time at the particular sample location at the first frequency; and
        generating a second probe measurement of the particular set of probe measurements by illuminating the sample with infrared light at the first wavelength that varies at a second frequency and measuring a magnitude and phase of a variation in displacement of the surface of the sample over time at the particular sample location at the second frequency, wherein the first frequency and the second frequency differ; and
    generating, based on the first plurality of sets of probe measurements, a three-dimensional tomographic map of absorption of infrared light at the first wavelength by the sample.

2. The method of claim 1, wherein generating the first plurality of sets of probe measurements comprises operating an atomic force microscopy (AFM) probe in contact mode to detect changes in the displacement of the surface of the sample over time at each of the sample locations located across the surface of the sample.

3. The method of claim 2, wherein a tip of the AFM probe exhibits an electric field enhancement at 0.5 nm below the AFM probe of less than 200 wherein the electric field enhancement is defined as |electric field enhancement|=|local electric field/incident electric field |².

4. The method of claim 2, further comprising:
    prior to generating the first plurality of sets of probe measurements, adding a cover layer to the surface of the sample, wherein the cover layer is substantially non-absorptive of infrared light at the first wavelength.

5. The method of claim 1, further comprising:
    generating a second plurality of sets of probe measurements for the plurality of sample locations located across the surface of the sample, wherein generating, for a particular sample location, a particular set of probe measurements of the second plurality of sets of probe measurements comprises:
        generating a first probe measurement of the particular set of probe measurements by illuminating the sample with infrared light at a second wavelength that varies at the first frequency, wherein the second wavelength differs from the first wavelength, and measuring a magnitude and phase of a variation in displacement of the surface of the sample over time at the particular sample location at the first frequency; and
        generating a second probe measurement of the particular set of probe measurements by illuminating the sample with infrared light at the second wavelength that varies at the second frequency and measuring a magnitude and phase of a variation in displacement of the surface of the sample over time at the particular sample location at the second frequency, wherein the first frequency and the second frequency differ; and
    generating, based on the second plurality of sets of probe measurements, a three-dimensional tomographic map of absorption of infrared light at the second wavelength by the sample.

6. The method of claim 1, further comprising:
    generating a first thermoelastic Green's function that provides a magnitude and phase of variation in displacement of the surface of the sample over time at a given location at the first frequency as a function of a distribution of heating within the sample in a vicinity of the given location in response to illumination of the sample with infrared light that varies at the first frequency; and
    generating a second thermoelastic Green's function that provides a magnitude and phase of variation in displacement of the surface of the sample over time at a given location at the second frequency as a function of a distribution of heating within the sample in the vicinity of the given location in response to illumination of the sample with infrared light that varies at the second frequency,
    wherein generating the three-dimensional tomographic map of absorption of infrared light at the first wavelength by the sample based on the first plurality of sets of probe measurements comprises solving for a three-dimensional pattern of absorption of infrared light at the first wavelength within the sample using the first thermoelastic Green's function and the second thermoelastic Green's function.

7. The method of claim 6, wherein solving for the three-dimensional pattern of absorption of infrared light at the first wavelength within the sample using the first thermoelastic Green's function and the second thermoelastic Green's function comprises using an Optimally Localized Average method.

8. The method of claim 6, further comprising:
inserting, into the sample, a fiducial of known geometry that absorbs infrared light at a third wavelength that differs from the first wavelength, wherein a remainder of the sample is substantially does not absorb infrared light at the third wavelength;
subsequent to inserting the fiducial into the sample, generating a third plurality of sets of probe measurements for the plurality of sample locations located across the surface of the sample, wherein generating, for a particular sample location, a particular set of probe measurements of the third plurality of sets of probe measurements comprises:
generating a first probe measurement of the particular set of probe measurements by illuminating the sample with infrared light at the third wavelength that varies at the first frequency and measuring a magnitude and phase of a variation in displacement of the surface of the sample over time at the particular sample location at the first frequency; and
generating a second probe measurement of the particular set of probe measurements by illuminating the sample with infrared light at the third wavelength that varies at the second frequency and measuring a magnitude and phase of a variation in displacement of the surface of the sample over time at the particular sample location at the second frequency, wherein the first frequency and the second frequency differ; and
generating the first thermoelastic Green's function and the second thermoelastic Green's function based on the third plurality of sets of probe measurements.

9. The method of claim 6, further comprising:
generating the first thermoelastic Green's function and the second thermoelastic Green's function based on a set of known thermoelastic properties of the sample.

10. The method of claim 1, wherein generating the first plurality of sets of probe measurements comprises generating the first plurality of sets of probe measurements with a signal to noise ratio greater than 100.

11. A system for nanoscale tomographic infrared absorption imaging, the system comprising:
an infrared light emitter;
an actuated probe configured to detect displacement of a surface of a sample; and
a controller comprising one or more processors, wherein the one or more processors are configured to perform controller operations comprising:
generating a first plurality of sets of probe measurements for a plurality of sample locations located across a surface of a sample, wherein generating, for a particular sample location, a particular set of probe measurements of the first plurality of sets of probe measurements comprises:
generating a first probe measurement of the particular set of probe measurements by operating the infrared light emitter to illuminate the sample with infrared light at a first wavelength that varies at a first frequency and operating the actuated probe to measure a magnitude and phase of a variation in displacement of the surface of the sample over time at the particular sample location at the first frequency; and
generating a second probe measurement of the particular set of probe measurements by operating the infrared light emitter to illuminate the sample with infrared light at the first wavelength that varies at a second frequency and operating the actuated probe to measure a magnitude and phase of a variation in displacement of the surface of the sample over time at the particular sample location at the second frequency, wherein the first frequency and the second frequency differ; and
generating, based on the first plurality of sets of probe measurements, a three--dimensional tomographic map of absorption of infrared light at the first wavelength by the sample.

12. The system of claim 11, wherein the actuated probe comprises an atomic force microscopy (AFM) probe, and wherein generating the first plurality of sets of probe measurements comprises operating the AFM probe in contact mode to detect changes in the displacement of the surface of the sample over time at each of the sample locations located across the surface of the sample.

13. The system of claim 12, wherein a tip of the AFM probe exhibits an electric field enhancement at 0.5 nm below the AFM probe of less than 200, wherein the electric field enhancement is defined as |electric field enhancement|$^2$=|local electric field/incident electric field F.

14. The system of claim 11, wherein the controller operations further comprise:
generating a first thermoelastic Green's function that provides a magnitude and phase of variation in displacement of the surface of the sample over time at a given location at the first frequency as a function of a distribution of heating within the sample in a vicinity of the given location in response to illumination of the sample with infrared light that varies at the first frequency; and
generating a second thermoelastic Green's function that provides a magnitude and phase of variation in displacement of the surface of the sample over time at a given location at the second frequency as a function of a distribution of heating within the sample in the vicinity of the given location in response to illumination of the sample with infrared light that varies at the second frequency,
wherein generating the three-dimensional tomographic map of absorption of infrared light at the first wavelength by the sample based on the first plurality of sets of probe measurements comprises solving for a three-dimensional pattern of absorption of infrared light at the first wavelength within the sample using the first thermoelastic Green's function and the second thermoelastic Green's function.

15. The system of claim 14, wherein solving for the three-dimensional pattern of absorption of infrared light at the first wavelength within the sample using the first thermoelastic Green's function and the second thermoelastic Green's function comprises using an Optimally Localized Average method.

16. A method for nanoscale tomographic imaging of heat dissipation in an electronic device, the method comprising:
generating a first plurality of sets of probe measurements for a plurality of sample locations located across a surface of an electronic device, wherein generating, for a particular sample location, a particular set of probe measurements of the first plurality of sets of probe measurements comprises:
generating a first probe measurement of the particular set of probe measurements by operating the electronic device to dissipate heat in a manner that varies at a first frequency and measuring a magnitude and phase of a variation in displacement of the surface of the electronic device over time at the particular sample location at the first frequency; and
generating a second probe measurement of the particular set of probe measurements by operating the electronic device to dissipate heat in a manner that varies at a second frequency and measuring a magnitude and phase of a variation in displacement of the surface of the electronic device over time at the particular sample location at the second frequency, wherein the first frequency and the second frequency differ; and
generating, based on the first plurality of sets of probe measurements, a three-dimensional tomographic map of dissipation of heat by the electronic device.

17. The method of claim 16, wherein generating the first plurality of sets of probe measurements comprises generating the first plurality of sets of probe measurements with a signal to noise ratio greater than 100.

18. The method of claim 16, further comprising:
generating a first thermoelastic Green's function that provides a magnitude and phase of variation in displacement of the surface of the electronic device over time at a given location at the first frequency as a function of a distribution of heat dissipation within the electronic device in a vicinity of the given location in response to operating the electronic device to dissipate heat in a manner that varies at the first frequency; and
generating a second thermoelastic Green's function that provides a magnitude and phase of variation in displacement of the surface of the electronic device over time at a given location at the second frequency as a function of a distribution of heat dissipation within the electronic device in the vicinity of the given location in response to operating the electronic device to dissipate heat in a manner that varies at the second frequency,
wherein generating the three-dimensional tomographic map of dissipation of heat by the electronic device based on the first plurality of sets of probe measurements comprises solving for a three-dimensional pattern of dissipation of heat within the electronic device using the first thermoelastic Green's function and the second thermoelastic Green's function.

19. The method of claim 18, wherein solving for the three-dimensional pattern of dissipation of heat within the electronic device using the first thermoelastic Green's function and the second thermoelastic Green's function comprises using an Optimally Localized Average method.

20. The method of claim 18, further comprising:
generating the first thermoelastic Green's function and the second thermoelastic Green's function based on a set of known thermoelastic properties of the electronic device.

* * * * *